(12) United States Patent
Yokoi

(10) Patent No.: US 8,436,069 B2
(45) Date of Patent: May 7, 2013

(54) INK COMPOSITION

(75) Inventor: Kazuhiro Yokoi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 267 days.

(21) Appl. No.: 12/723,700

(22) Filed: Mar. 15, 2010

(65) Prior Publication Data

US 2010/0249261 A1    Sep. 30, 2010

(30) Foreign Application Priority Data

Mar. 30, 2009   (JP) .................................. 2009-083048

(51) Int. Cl.
| | |
|---|---|
| C08F 2/50 | (2006.01) |
| C08F 20/22 | (2006.01) |
| B29C 71/04 | (2006.01) |
| B01F 3/04 | (2006.01) |

(52) U.S. Cl.
USPC ............... 522/39; 522/64; 522/167; 522/168; 522/172; 522/183

(58) Field of Classification Search .................... 522/39, 522/172, 173, 167, 168, 182, 183, 64
See application file for complete search history.

(56) References Cited

FOREIGN PATENT DOCUMENTS

| | | |
|---|---|---|
| EP | 2042572 A1 | 4/2008 |
| EP | 1983017 A1 | 10/2008 |
| EP | 2028241 A1 | 2/2009 |
| EP | 2088176 A1 | 8/2009 |
| JP | 2002-167537 A | 6/2002 |
| JP | 2004-149755 A | 5/2004 |
| WO | 2008/045517 A2 | 4/2008 |
| WO | 2009/048585 A1 | 4/2009 |

OTHER PUBLICATIONS

Showa Denko, KarenzMT® data sheet, p. 1-2.*
Tsuchimura, Tomotaka, machine English translation of JP 2006-274083, pub. Oct. 12, 2006.*

* cited by examiner

*Primary Examiner* — Michael Pepitone
*Assistant Examiner* — Jessica Paul
(74) *Attorney, Agent, or Firm* — SOLARIS Intellectual Property Group, PLLC

(57) ABSTRACT

The present invention provides an ink composition containing: a radical polymerizable compound; a photopolymerization initiator, and a chain transfer agent; and the radical polymerizable compound includes a monofunctional monomer at a ratio of 85% by weight or more in the total weight of the radical polymerizable compound.

8 Claims, No Drawings

INK COMPOSITION

CROSS-REFERENCE TO RELATED APPLICATION

This application claims priority under 35 USC 119 from Japanese Patent Application No. 2009-083048 filed on Mar. 30, 2009, the disclosure of which is incorporated by reference herein.

BACKGROUND

1. Field of the Invention

The invention relates to an ink composition.

2. Related Art

As image recording methods for forming an image on a medium to be recorded such as paper based on an image data signal, an electrophotographic system, sublimation type and melt type thermal transfer systems, an inkjet system and the like may be exemplified. For example, the inkjet system uses an inexpensive equipment and, since an image is formed directly on a medium to be recorded by jetting ink only on a required image area, the ink may be used efficiently and the running cost is low. Furthermore, the inkjet system makes little noise, and is excellent as an image recording system.

It is possible to print not only on plain paper but also on a non-water absorbing medium to be recorded such as a plastic sheet or a metal sheet by using the inkjet system, but achieving higher printing speed and higher image quality upon printing is an important issue, and the time required for drying droplets and curing after printing greatly affects the producibility of the printed product and the sharpness of the printed image.

As one inkjet system, there is a recording system using inkjet recording ink that may be cured by irradiation of radioactive ray. According to this method, producibility of printing is improved and a sharp image may be formed by irradiating with radiation immediately after jetting of the ink or after a predetermined period so as to cure ink droplets.

By achieving improvement of sensitivity of an inkjet recording ink which may be cured by irradiation with radiation such as ultraviolet ray, high curability against radiation is imparted, and many benefits including improvement of producibility of inkjet recording, decrease in power consumption, elongation of lifetime by decreasing load on a radiation generator, and prevention of generation of evaporation of low molecular materials due to insufficient curing, are obtained. Furthermore, improvement of sensitivity specifically improves the intensity of an image formed by inkjet recording ink.

Examples of preferable properties in an image formed by ink include adhesibility to a substrate and flexibility of the image. Specifically, flexibility of the image is an important factor when an image is formed on an uneven substrate or the surface of a flexible substrate such as a resin film, as well as when a printed formed article in which a formed article is formed after printing on the surface, such as a resin bottle, is produced, but it is difficult to balance flexibility with curability. That is, when the ratio of a monofunctional monomer is increased so as to improve flexibility, there is concern that curability is decreased, or tackiness of the image surface is caused due to bleeding of uncured low molecular components.

In order to improve adhesibility, flexibility and curing characteristics, a technique for using an urethane acrylate having low viscosity in an ink composition for inkjet has been suggested (e.g., see Japanese Patent Application Laid-open (JP-A) No. 2002-167537).

In order to obtain a photopolymerization initiator composition which cures with high sensitivity and is excellent in preserving property, a technique using a multifunctional thiol compound having a specific structure in a photosensitive composition as one of components in a photopolymerization initiator composition has been disclosed (e.g., see JP-A No. 2004-149755 and European Patent Application Laid-open No. 1983017).

SUMMARY

The present invention has been made in view of the above circumstances and provides an ink composition comprising: a radical polymerizable compound; a photopolymerization initiator; and a chain transfer agent; wherein the radical polymerizable compound comprises a monofunctional monomer at a ratio of 85% by weight or more in the total weight of the radical polymerizable compound.

DETAILED DESCRIPTION OF THE INVENTION

In the ink composition described in JP-A No. 2002-167537, since a softer ink film was prepared, it was difficult to maintain sufficient curability when the content ratio of the monofunctional monomer was increased. Furthermore, in the technique described in JP-A No. 2004-149755, it is difficult to completely suppress blocking due to leaching of small incurable components including decomposition residues of the polymerization initiator, solvents and the like under present circumstances.

Accordingly, conventional inks had problems that flexibility and sensitivity which allow processing could not be balanced, and that transfer to back surfaces occurs during stacking and uncured components are volatilized during storage.

The object of the invention is to solve the above-mentioned conventional problems and attain the following object. That is, an object of the invention is to provide an ink composition which is preferable for inkjet recording, which is excellent in flexibility and may decrease remaining volatile components.

The ink composition of the invention contains a radical polymerizable compound, a photopolymerization initiator and a chain transfer agent, and the radical polymerizable compound comprises a monofunctional monomer at a ratio of 85% by weight or more in the total weight of the radical polymerizable compound.

When volatile components derived from components of an ink composition remain on a processed product or a printed product which has been printed using the ink composition, not only the processed product or printed product is affected (dissolution, bleeding and the like), but also a printed processed product or a vacuum-formed processed product which encloses the printed product may also be affected. For example, volatile components generated from the printed product may evaporate and adhere to the inside of a sealed container. More specifically, during production of instrument panels for automobiles, when volatile components remain on a printed formed product on which numbers of a meter are printed, an instrument panel-protecting glass is fogged and the meter becomes difficult to be seen. Furthermore, in dummy cans which are formed by printing the name, components and the like of beverage for displaying PET bottles for filling beverage, and vacuum-forming, when the dummy cans are housed in an automatic vending machine, the display part of the automatic vending machine may be fogged due to volatile components evaporated from the dummy cans.

Therefore, it is preferable that the ink composition does not contain volatile components which readily remain.

Meanwhile, the monofunctional monomer included in the ink composition of the invention has low viscosity and may be used as a solvent.

Since the monofunctional monomer is also a volatile component, when the monofunctional monomer remains after printing, it may affect the processed product. However, since the ink composition of the invention contains a chain transfer agent, the polymerization reaction of the polymerizable compound is accelerated, whereby residual monomers may be decreased. Furthermore, due to the polymer obtained by polymerization of the monofunctional monomer, the cured ink composition shows elongation property.

Accordingly, by adjusting the ink composition of the invention to contain a radical polymerizable compound, a photopolymerization initiator and a chain transfer agent, and adjusting the ratio of the monofunctional monomer in the total weight of the radical polymerizable compound to 85% by weight or more, the elongation property and flexibility of the ink composition may also be improved.

According to a preferable exemplary embodiment of the invention, the ink composition contains a polymer having a partial structure selected from the group consisting of a fluorine-substituted hydrocarbon group, a siloxane backbone and a long chain alkyl group at a side chain (the polymer may further have polymerizable substituents). Since the polymer is segregated on the surface of a cured film of the ink composition, evacuation or scattering of volatile components may be suppressed by the polymer even when the volatile components remain on the cured film. When the polymer has polymerizable groups, since the polymer covers the surface of the cured film of the ink composition more strongly by polymerization of the polymerizable groups, the residual volatile components may become difficult to be leaked out of the cured film.

Therefore, according to the invention, an ink composition which is excellent in flexibility and may decrease residual volatile components, which is preferable for use in inkjet recording, may be obtained. As a result, a step for evaporating volatile components is omitted during printing using the ink composition, and a printed product having excellent processing suitability may be obtained.

Hereinafter the ink composition of the invention is described in detail.

[Radical Polymerizable Compound]

The ink composition of the invention contains a radical polymerizable compound.

Although the kind of the radical polymerizable compound is not specifically limited, it is necessary that the ratio of the monofunctional monomer in the total weight of the radical polymerizable compound is 85% by weight or more. This aims at improving the elongation property and flexibility of the ink composition, as mentioned above.

The ratio of the monofunctional monomer in the total weight of the radical polymerizable compound is preferably 85% by weight to 100% by weight, more preferably 90% by weight to 100% by weight.

The radical polymerizable compound refers to a compound having at least one radical polymerizable ethylenic unsaturated bond in the molecule, including a compound which has a chemical form of a monomer, an oligomer, a polymer or the like.

The monofunctional monomer which is included by 85% by weight or more in the total weight of the radical polymerizable compound is a compound having one radical polymerizable ethylenic unsaturated bond in the molecule.

The radical polymerizable compound may be used by solely one kind, or may be used as a combination of two or more kinds at any ratio in order to improve the objective property. It is preferable to use two or more kinds in combination in controlling performances including reactivity, physical properties and the like.

It is preferable that the radical polymerizable compound has a different structure from that of the surface-segregating polymer mentioned below. Hereinafter the "radical polymerizable compound having a different structure from that of the surface-segregating polymer" is simply referred to as "radical polymerizable compound".

Examples of the polymerizable compound having a radical polymerizable ethylenic unsaturated bond may include radical polymerizable compounds including unsaturated carboxylic acids such as acrylic acid, methacrylic acid, itaconic acid, crotonic acid, isocrotonic acid and maleic acid, and salts thereof, anhydrides having an ethylenic unsaturated group, acrylonitrile and styrene, as well as various unsaturated polyesters, unsaturated polyethers, unsaturated polyamides and unsaturated urethane.

Specifically, commercial products described in "Kakyouzai Handbook (Crosslinking Agent—A Handbook)", Ed Shinzo Yamashita (Taiseisha, 1981); "UV-EB (UV-EB Curing Handbook)" (Raw Materials) Ed. Kiyomi Kato (Kobunshi Kankoukai, 1985); "Kouka Gijutsu no Oyo to Shijo (Application and Market of UV-EB Curing Technology)", p. 79, Ed. Rad Tech (CMC, 1989); and Eiichiro Takiyama "Polyester Resin Handbook", (The Nikkan Kogyo Shimbun Ltd., 1988) and the like, or radical polymerizable or crosslinkable monomers, oligomers and polymers known in the art may be used.

Furthermore, as the radical polymerizable compound, for example, photocurable polymerizable compound materials used in photopolymerizable compositions described in JP-A No. 7-159983, Japanese Patent Application Publication (JP-B) No. 7-31399, JP-A Nos. 8-224982, 10-863 and 9-134011, and the like are known, and they may also be applied to the ink composition of the invention.

Moreover, it is also preferable to use a vinyl ether compound as the radical polymerizable compound. Examples of the vinyl ether compound which is preferably used include di- or trivinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexane dimethanol divinyl ether, hydroxyethyl monovinyl ether, hydroxynonyl monovinyl ether and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-O-propylenecarbonate, dodecyl vinyl ether, diethylene glycol monovinyl ether and octadecyl vinyl ether.

Among these vinyl ether compounds, divinyl ether compounds and trivinyl ether compounds are preferable, and divinyl ether compounds are particularly preferable in view of curability, adhesibility and surface hardness. The vinyl ether compounds may be used by solely one kind, or as a suitable combination of two or more kinds.

As a monomer which may be used as the monofunctional monomer included in the total weight of the radical polymerizable compound by 85% by weight or more, the monomers described in "Hikari Kouka Gijutsu Databook, Zairyou-hen (Photocuring Technology Databook, Materials)" (supervised by Kunihiro Ichimura and Kiyomi Kato, edited by Technonet Kabushiki Kaisha) may be preferably used.

Among these, the monofunctional monomer preferably include one or more kinds selected from amine group-containing monomers, N-vinylcaprolactam (NVC), tetrahydrofurfuryl acrylate (THFA), isobornyl acrylate (IBOA) and phenoxyethyl acrylate (PEA) in view of improving adhesibility between the ink composition and substrate during printing on a medium to be recorded (substrate) such as polycarbonate (PC).

As the amine group-containing monomer, a monomer comprising a tertiary amine is more preferable in view of dispersion stability and the like, and specific preferable examples may include 1,2,2,6,6-pentamethylpiperidyl acrylate, dimethylaminoethyl acrylate and diethylaminopropyl acrylate.

It is more preferable that the monofunctional monomer includes one or more kinds selected from amine group-containing monomers, NVC, THFA, IBOA and phenoxyethyl acrylate PEA.

The content of the radical polymerizable compound in the total solid content of the ink composition of the invention is preferably 50% by weight to 90% by weight, more preferably 55% by weight to 90% by weight, further preferably 60% by weight to 85% by weight. By adjusting the content to the above-mentioned range, a coating having fine curability and color reproducibility may be obtained.

In order to further improve the flexibility of the coating, the content of the monofunctional monomer in the whole radical polymerizable compound is preferably 60% by weight to 100% by weight, more preferably 70% by weight to 100% by weight, and further preferably 80% by weight to 100% by weight.

[Chain Transfer Agent]

The ink composition of the invention contains a chain transfer agent.

As the chain transfer agent, any material may be used without limitation as long as it is a material which transfers the active point of reaction by chain transfer reaction in polymerization reaction. The frequency of transfer reaction by a chain transfer agent is represented by a chain transfer constant Cs, and the chain transfer constant of the chain transfer agent used in the invention $Cs \times 10^4$ (60° C.) is preferably 0.01 or more, more preferably 0.1 or more, and particularly preferably 1 or more.

Specific examples of the chain transfer agent which may be used in the invention may include, but are not limited to, halogen compounds such as carbon tetrachloride and carbon tetrabromide; alcohols such as isopropyl alcohol and isobutyl alcohol; olefins such as 2-methyl-1-butene and 2,4-diphenyl-4-methyl-1-pentene; and sulfur-containing compounds such as ethanethiol, butanethiol, dodecanethiol, mercaptoethanol, mercaptopropanol, methyl mercaptopropionate, ethyl mercaptopropionate, mercaptopropionic acid, thioglycolic acid, ethyl disulfide, sec-butyl disulfide, 2-hydroxyethyl disulfide, thiosalicylic acid, thiophenol, thiocresol, benzyl mercaptane, phenethyl mercaptane and thiocarbonate.

Among the above-mentioned chain transfer agents, the chain transfer agent is preferably a thiol compound in view of storage stability and improvement of sensitivity of the ink composition. Furthermore, the chain transfer agent is more preferably a multifunctional thiol compound of a secondary or tertiary thiol in view of decreasing of remaining monomers which have not been polymerized (residual monomers) in the polymerization reaction of the polymerizable compound, and decreasing of odor.

The molecular weight of the chain transfer agent is preferably 250 or more and 100,000 or less, more preferably 500 or more and 80,000 or less, and most preferably 3,000 or more and 80,000 or less in view of suppression of blocking.

As commercial products, KARENZ MT series (trade name, manufactured by Showa Denko K. K.) are preferably used.

Examples of a compound which is more preferably as a chain transfer agent may include CTA-1 to CTA-8 mentioned below.

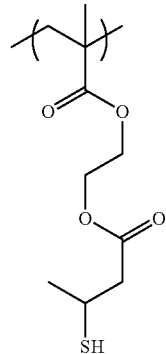

CTA-1

Mw = 16000

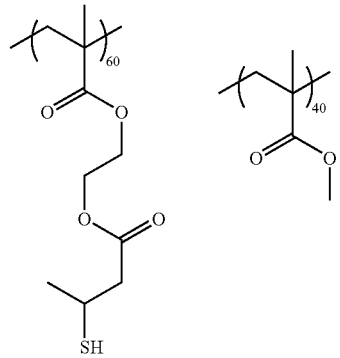

CTA-2

Mw = 24000

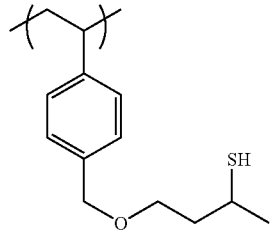

CTA-3

Mw = 28000

-continued

CTA-4

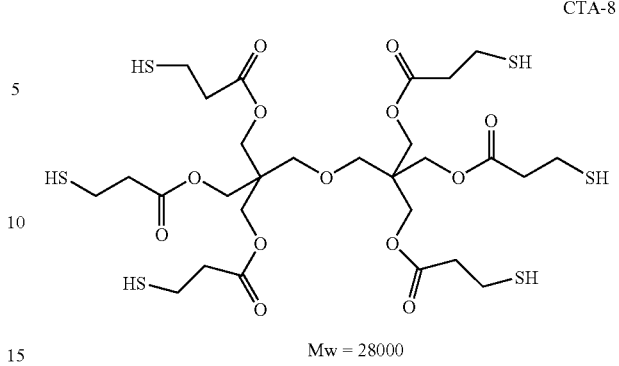

Mw = 28000

CTA-5

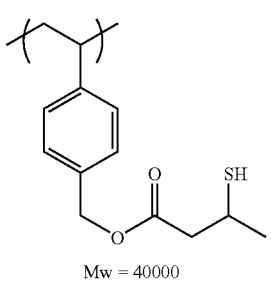

Mw = 40000

Among CTA-1 to CTA-8, CTA-1, CTA-3 and CTA-5 are preferable in view of storage stability and decreasing of odor.

The chain transfer agent may be used by solely one kind, or as a combination of two or more kinds.

The amount of the chain transfer agent to be added to the ink composition of the invention is preferably 0.1% by weight to 15% by weight, more preferably 0.5% by weight to 10% by weight, and most preferably 1% by weight to 10% by weight with respect to the total solid weight of the ink composition. By using the chain transfer agent in this range, residual monomers may be decreased and generation of volatile components after curing of the ink composition may be suppressed.

[Photopolymerization Initiator]

The ink composition of the invention includes a photopolymerization initiator.

In the invention, it is preferable to include the polymerization initiator selected from the group consisting of α-aminoketones and acylphosphine oxides which are mentioned below in detail. Alternatively, the polymerization initiator may be used in combination with other known polymerization initiator.

[Polymerization Initiator Selected from the Group Consisting of α-aminoketones and Acylphosphine Oxides]

Hereinafter the polymerization initiator selected from the group consisting of α-aminoketones and acylphosphine oxides (hereinafter referred to as a specific polymerization initiator) is described in detail.

The polymerization initiator which is preferably used in the invention is a photopolymerization initiator selected from the group consisting of α-aminoketones and acylphosphine oxides.

The α-aminoketones, which is a specific polymerization initiator, is a compound represented by the following formula (1).

CTA-6

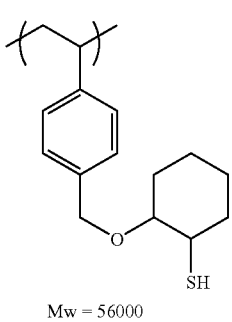

Mw = 30000

CTA-7

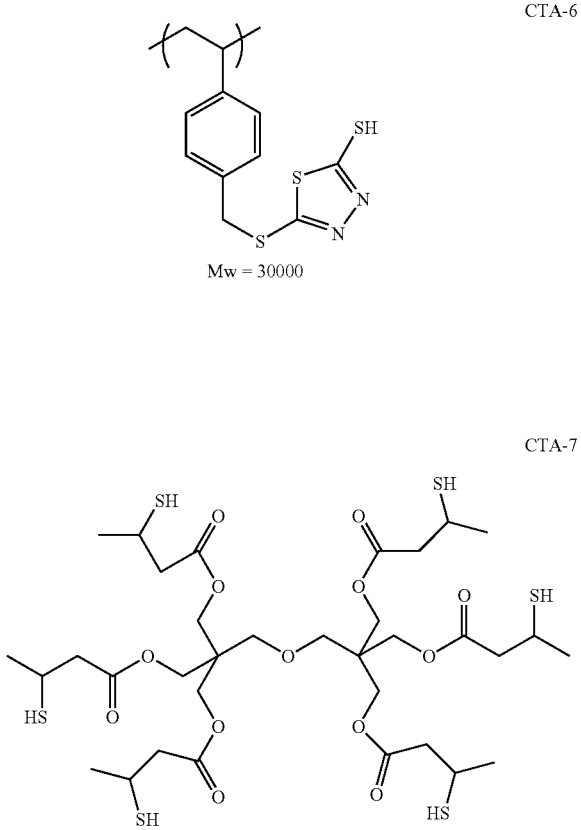

Mw = 867

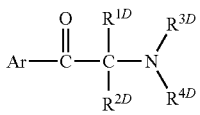

Formula (1)

In the formula (1), Ar represents $-SR^{13}$, or a phenyl group substituted with $-N(R^{7E})(R^{8E})$, wherein $R^{13}$ represents a hydrogen atom or an alkyl group.

$R^{1D}$ and $R^{2D}$ each independently represent an alkyl group having 1 to 8 carbon atoms. $R^{1D}$ and $R^{2D}$ may bind each other to form an alkylene group having 2 to 9 carbon atoms.

$R^{3D}$ and $R^{4D}$ each independently represent a hydrogen atom, an alkyl group having 1 to 12 carbon atoms, an alkyl group having 2 to 4 carbon atoms substituted with an alkoxy group having 1 to 4 carbon atoms, or an alkenyl group having 3 to 5 carbon atoms. $R^{3D}$ and $R^{4D}$ may bind each other to form an alkylene group having 3 to 7 carbon atoms, wherein the alkylene group may include —O— or —N($R^{12}$)— in the alkylene chain (wherein $R^{12}$ represents an alkyl group having 1 to 4 carbon atoms).

$R^{7E}$ and $R^{8E}$ each independently represent a hydrogen atom, an alkyl group having 1 to 12 carbon atoms, an alkyl group having 2 to 4 carbon atoms substituted with an alkoxy group having 1 to 4 carbon atoms, or an alkenyl group having 3 to 5 carbon atoms. $R^{7E}$ and $R^{8E}$ may bind each other to form an alkylene group having 3 to 7 carbon atoms, wherein the alkylene group may include —O— or —N($R^{12}$)— in the alkylene chain (wherein $R^{12}$ is as defined above).

Examples of the compounds encompassed in the α-aminoketones may include 2-methyl-1-phenyl-2-morpholino-propane-1-one, 2-methyl-1-[4-(hexyl)phenyl]-2-morpholinopropane-1-one and 2-ethyl-2-dimethylamino-1-(4-morpholinophenyl)-butanone-1. Furthermore, the compounds are available as commercial products including IRGACURE series including IRGACURE 907, IRGACURE 369 and IRGACURE 379 (trade names, manufactured by Ciba Geigy), which are also compounds encompassed in the α-aminoketones and may be preferably used in the invention.

The compound encompassed in the acylphosphine oxide is a compound represented by the following formula (2) or (3).

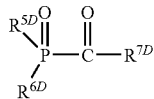

Formula (2)

In the formula (2), $R^{5D}$ and $R^{6D}$ each independently represent an aliphatic group, an aromatic group, an aliphatic oxy group, an aromatic oxy group or a heterocyclic group, and $R^{7D}$ represents an aliphatic group, an aromatic group or a heterocyclic group.

Examples of the aliphatic group represented by $R^{5D}$, $R^{6D}$ or $R^{7D}$ may include an alkyl group, a substituted alkyl group, an alkenyl group, a substituted alkenyl group, an alkynyl group, a substituted alkynyl group, an aralkyl group and a substituted aralkyl group, of which an alkyl group, a substituted alkyl group, an alkenyl group, a substituted alkenyl group, an aralkyl group and a substituted aralkyl group are preferable, and an alkyl group and a substituted alkyl group are particularly preferable. The aliphatic group may be a cyclic aliphatic group or a chain aliphatic group. The chain aliphatic group may have branches.

Examples of the alkyl group may include linear, branched or cyclic alkyl groups, and the number of the carbon atoms in the alkyl group is preferably 1 to 30, more preferably 1 to 20. The preferable range of the number of the carbon atoms in the alkyl moiety of the substituted alkyl group is same as that of the alkyl group. The alkyl group may be an alkyl group having substituents, or an unsubstituted alkyl group. Examples of the alkyl group may include a methyl group, an ethyl group, a propyl group, a butyl group, a pentyl group, a hexyl group, an octyl group, a 2-ethylhexyl group, a decyl group, a dodecyl group, an octadecyl group, a cyclohexyl group, a cyclopentyl group, a neopentyl group, an isopropyl group and an isobutyl group.

Examples of the substituents for the substituted alkyl group may include a carboxyl group, a sulfo group, a cyano group, a halogen atom (e.g., a fluorine atom, a chlorine atom, a bromine atom), a hydroxy group, an alkoxycarbonyl group having 30 or less carbon atoms (e.g., a methoxycarbonyl group, an ethoxycarbonyl group, a benzyloxycarbonyl group), an alkylsulfonylaminocarbonyl group having 30 or less carbon atoms, an arylsulfonylaminocarbonyl group, an alkylsulfonyl group and an arylsulfonyl group, an acylaminosulfonyl group having 30 or less carbon atoms, an alkoxy group having 30 or less carbon atoms (e.g., a methoxy group, an ethoxy group, a benzyloxy group, a phenoxyethoxy group, a phenethyloxy group and the like), an alkylthio group having 30 or less carbon atoms (e.g., a methylthio group, an ethylthio group, a methylthioethylthioethyl group and the like), an aryloxy group having 30 or less carbon atoms (e.g., a phenoxy group, a p-tryloxy group, a 1-naphthoxy group, 2-naphthoxy group and the like), a nitro group, an alkyl group having 30 or less carbon atoms, an alkoxycarbonyloxy group and an aryloxycarbonyloxy group, an acyloxy group having 30 or less carbon atoms (e.g., an acetyloxy group, a propionyloxy group and the like), an acyl group having 30 or less carbon atoms (e.g., an acetyl group, a propionyl group, a benzoyl group and the like), a carbamoyl group (e.g., a carbamoyl group, an N,N-dimethylcarbamoyl group, a morpholinocarbonyl group, a piperidinocarbonyl group and the like), a sulfamoyl group (e.g., a sulfamoyl group, an N,N-dimethylsulfamoyl group, a morpholinosulfonyl group, a piperidinosulfonyl group and the like), an aryl group having 30 or less carbon atoms (e.g., a phenyl group, a 4-chlorophenyl group, a 4-methylphenyl group, an α-naphthyl group and the like), a substituted amino group (e.g., an amino group, an alkylamino group, a dialkylamino group, an arylamino group, a diarylamino group, an acylamino group and the like), a substituted ureido group, a substituted phosphono group and a heterocyclic group. The carboxyl group, sulfo group, hydroxy group and phosphono group may be in the form of a salt. In such case, examples of the cation which forms the salt may include $M^+$ described below.

Examples of the alkenyl group may include linear, branched or cyclic alkenyl groups, and the number of the carbon atoms in the alkenyl group is preferably 2 to 30, more preferably 2 to 20. The alkenyl group may be a substituted alkenyl group having substituents, or an unsubstituted alkenyl group, and the preferable range of the number of the carbon atoms in the alkenyl moiety in the substituted alkenyl group is same as that of the alkenyl group. Examples of the substituents for the substituted alkenyl group may be substituents same as those for the substituted alkyl group.

Examples of the alkynyl group may include linear, branched or cyclic alkynyl groups, and the number of the carbon atoms in the alkynyl group is preferably 2 to 30, more preferably 2 to 20. The alkynyl group may be a substituted alkynyl group having substituents, or an unsubstituted alkynyl group, and the preferable range of the number of the carbon atoms in the alkynyl moiety in the substituted alkynyl group is same as that of the alkynyl group. Examples of the substituents for the substituted alkynyl group may be substituents same as those for the substituted alkyl group.

Examples of the aralkyl group may include linear, branched or cyclic aralkyl groups, and the number of the carbon atoms in the aralkyl group is preferably 7 to 35, more preferably 7 to 25. The aralkyl group may be a substituted aralkyl group having substituents, or an unsubstituted aralkyl group, and the preferable range of the number of the carbon atoms in the aralkyl moiety of the substituted aralkyl group is same as that of the aralkyl group. Examples of the substituents for the substituted aralkyl group may be substituents same as those for the substituted alkyl group.

Examples of the aromatic group represented by $R^{5D}$, $R^{6D}$ or $R^{7D}$ may include an aryl group and a substituted aryl group. The number of the carbon atoms in the aryl group is preferably 6 to 30, more preferably 6 to 20. The preferable range of the number of the carbon atoms in the aryl moiety of the substituted aryl group is same as that of the aryl group. Examples of the aryl group may include a phenyl group, an α-naphthyl group and a β-naphthyl group. Examples of the substituents for the substituted aryl group may be substituents same as those for the substituted alkyl group.

As the aliphatic oxy group represented by $R^{5D}$ or $R^{6D}$, an alkoxy group having 1 to 30 carbon atoms is preferable, and examples may include, but are not limited to, a methoxy group, an ethoxy group, a butoxy group, an octyloxy group and a phenoxyethoxy group.

As the aromatic oxy group represented by $R^{5D}$ or $R^{6D}$, an aryloxy group having 6 to 30 carbon atoms is preferable, and examples may include, but are not limited to, a phenoxy group, a methylphenyloxy group, a chlorophenyloxy group, a methoxyphenyloxy group and an octyloxyphenyloxy group.

As the heterocyclic group represented by $R^{5D}$, $R^{6D}$ or $R^{7D}$, a heterocyclic group containing N, O or S atom is preferable, and examples may include a pyridyl group, a furyl group, a thienyl group, an imidazolyl group and a pyrrolyl group.

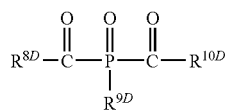

Formula (3)

$R^{8D}$ and $R^{10D}$ in the formula (3) each independently represent an alkyl group, an aryl group or a heterocyclic group, and $R^{9D}$ represents an alkyl group, an aryl group, an alkoxy group, an aryloxy group or a heterocyclic group. The alkyl group, the aryl group, the heterocyclic group, the alkoxy group and the aryloxy group represented by $R^{8D}$, $R^{9D}$ or $R^{10D}$ may have substituents, and examples of the substituents may include the substituents same as those for the formula (2).

The alkyl group, the aryl group, the heterocyclic group, the alkoxy group and the aryloxy group for the formula (3) are same as defined in the formula (2).

Examples of the acylphosphine oxides represented by the formula (2) or (3) may include the compounds described in JP-B Nos. 63-40799 and 5-29234, JP-A Nos. 10-95788 and 10-29997, and the like.

In the invention, examples of the specific acylphosphine oxides may include, but are not limited to, the following compounds [Exemplified compounds (P-1) to (P-26)].

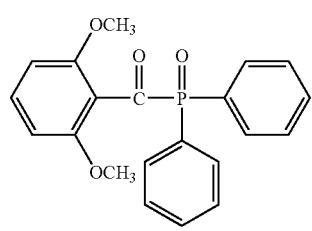
(P-1)

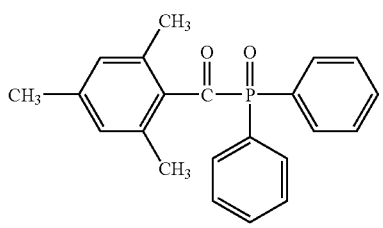
(P-2)

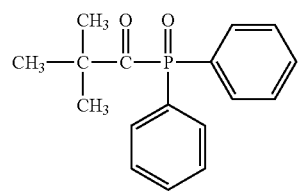
(P-3)

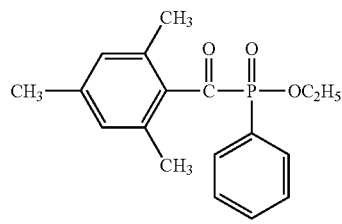
(P-4)

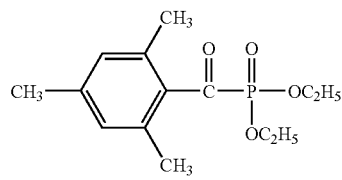
(P-5)

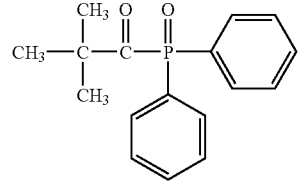
(P-6)

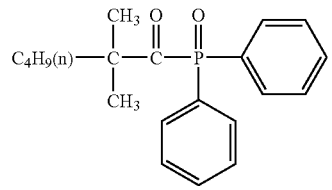
(P-7)

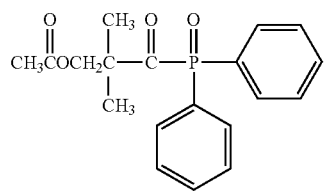
(P-8)

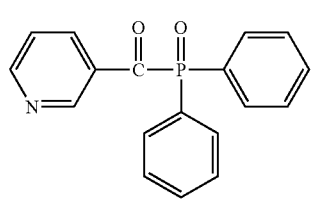
(P-9)

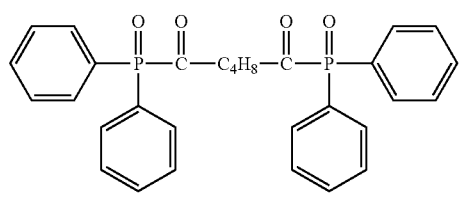 (P-10)
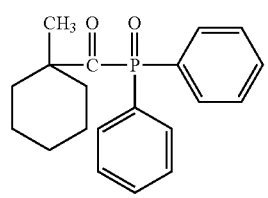 (P-11)
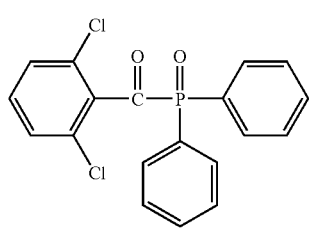 (P-12)
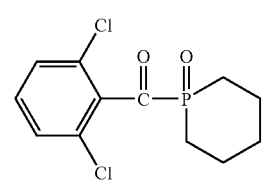 (P-13)
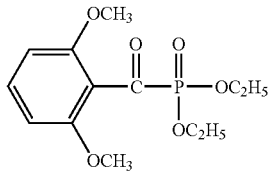 (P-14)
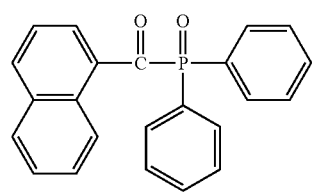 (P-15)
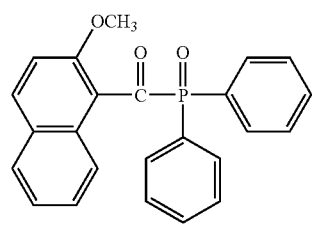 (P-16)
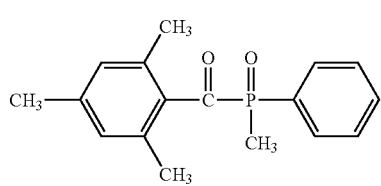 (P-17)
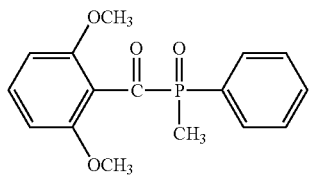 (P-18)
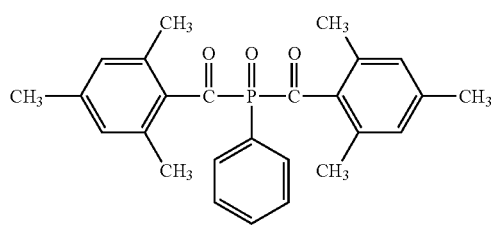 (P-19)
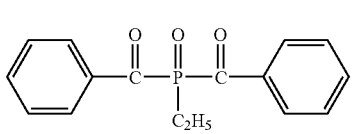 (P-20)
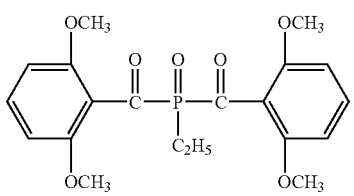 (P-21)
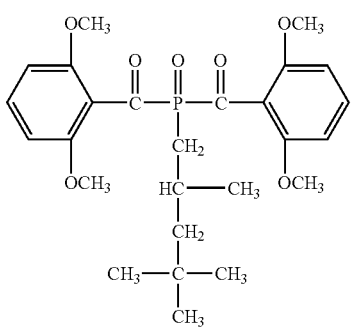 (P-22)
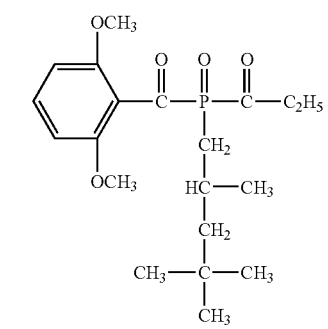 (P-23)
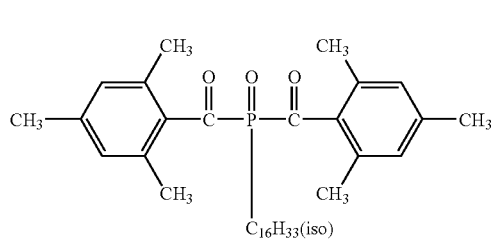 (P-24)

(P-25)

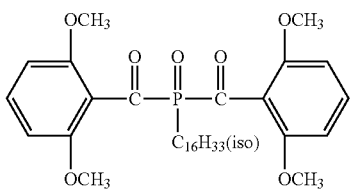

(P-26)

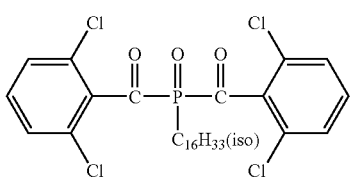

In the exemplified compounds, for example, (P-2) [2,4,6-trimethylbenzoyl-diphenyl-phosphine oxide] is available under the tradename of DAROCUR TPO (manufactured by Ciba Specialty Chemicals K.K.), and (P-19) [bis(2,4,6-trimethylbenzoyl)-phenylphosphine oxide] is available under the tradename of IRGACURE 819 (manufactured by Ciba Specialty Chemicals K.K.).

The content of the specific polymerization initiator in the ink composition of the invention is preferably in the range of 0.1% by weight to 30% by weight, more preferably in the range of 0.2% by weight to 20% by weight in solid content.

[Other Polymerization Initiator]

In the ink composition of the invention, other photopolymerization initiator may be used in combination as a photopolymerization initiator besides the specific polymerization initiator.

As the other photopolymerization initiator, a known compound may be used, and preferable examples which may be used in the invention include (A) aromatic ketones, (B) acylphosphine oxide compounds, (C) aromatic onium salt compounds, (D) organic peroxides, (E) thio compounds, (F) hexaarylbiimidazole compounds, (G) ketooxime ester compounds, (H) borate compounds, (I) azinium compounds, (J) metallocene compounds, (K) active ester compounds, (L) compounds having a carbon-halogen bond, and (M) alkylamine compounds.

In the invention, the other photopolymerization initiators may be used by solely one kind or as a combination. In view of effects, it is preferable to use two or more kinds of other photopolymerization initiators.

Specific examples of the other photopolymerization initiator used in the invention may include benzoin isobutyl ether, 2,4-diethylthioxanthone, 2-isopropylthioxanthone, benzyl, 2,4,6-trimethylbenzoyldiphenylphosphine oxide, 2-benzyl-2-dimethylamino-1-(4-morpholinophenyl)-butane-1-one, bis(2,4,6-dimethoxybenzoyl)-2,4,4-trimethylpentylphosphine oxide, 1,2-octanedione and 1-(4-(phenylthio)-2,2-(O-benzoyloxime)). Furthermore, as a molecular cleavage-type initiator other than these initiators, 1-hydroxycyclohexyl phenyl ketone, benzoin ethyl ether, benzyldimethylketal, 2-hydroxy-2-methyl-1-phenylpropane-1-one, 1-(4-isopropylphenyl)-2-hydroxy-2-methylpropane-1-one, 2-methyl-1-(4-methylthiophenyl)-2-morpholinopropane-1-one and the like may be used in combination. Moreover, isophthalphenone and 4-benzoyl-4'-methyl-diphenylsulfide, which are hydrogen-drawing photoinitiators, may be used in combination.

The content of the photopolymerization initiator in the ink composition of the invention is preferably 0.01 part by weight to 35 parts by weight, more preferably 0.1 parts by weight to 30 parts by weight, and further preferably 0.5 parts by weight to 30 parts by weight, with respect to the total content of the radical polymerizable compound of 100 parts by weight.

The content of the photopolymerization initiator described herein means the total content of the photopolymerization initiator including the specific polymerization initiator and other polymerization initiator which may be used in combination.

[Polymer Having a Partial Structure Selected from the Group Consisting of Fluorine-Substituted Hydrocarbon Group, Siloxane Backbone and Long Chain Alkyl Group at a Side Chain]

It is preferable that the ink composition of the invention include a polymer having a partial structure selected from the group consisting of a fluorine-substituted hydrocarbon group, a siloxane backbone and a long chain alkyl group at a side chain (hereinafter also referred to as "surface-segregating polymer") besides essential components including the radical polymerizable compound, photopolymerization initiator and chain transfer agent.

The surface-segregating polymer segregates on the surface of the cured film of the ink composition (an ink surface on an ink image) and suppresses bleeding and blocking of residual monomers and volatile components in the ink composition.

The above-mentioned surface-segregating polymer is a polymer having partial structures selected from the group consisting of 1) a fluorine-substituted hydrocarbon group, 2) a siloxane backbone and 3) a long chain alkyl group at a side chain.

Hereinafter the partial structures 1) to 3) are explained.

[1) Fluorine-Substituted Hydrocarbon Group]

The fluorine-substituted hydrocarbon group in the surface-segregating polymer in the invention may be a hydrocarbon group which is substituted by at least one fluorine atom, and examples may include a fluoroalkyl group and a fluoroalkylene group in which at least one hydrogen atom in an alkyl group or an alkylene group has been substituted with fluorine atom, more preferable examples include a perfluoroalkyl group and a perfluoroalkylene group in which all hydrogen atoms in an alkyl group or an alkylene group have been substituted with fluorine atoms, and further preferable examples include a perfluoroalkyl group.

The alkyl group has preferably 3 to 12 carbon atoms, more preferably 4 to 10 carbon atoms, and further preferably 6 to 8 carbon atoms.

The alkylene group has preferably 2 to 12 carbon atoms, more preferably 4 to 10 carbon atoms, and further preferably 6 to 8 carbon atoms.

The specific exemplary embodiments of the fluorine-substituted hydrocarbon group in the invention are described.

As a preferable fluorine-substituted hydrocarbon group possessed by the surface-segregating polymer, those represented by the following (A) or (B) may be exemplified.

(A) A substituent derived from a fluoroaliphatic compound produced by telomerization process or oligomerization process (hereinafter suitably referred to as "fluoroaliphatic group").

(B) A substituent represented by the following Formula (I):

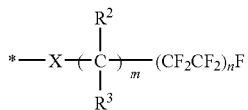

Formula (I)

In the Formula (I), $R^2$ and $R^3$ each independently represent a hydrogen atom or an alkyl group having 1 to 4 carbon atoms, X represents a covalent bond or a bivalent linking group (organic group), m represents an integer of 0 or more, and n represents an integer of 1 or more.

When m is 2 or more, the functional groups on the carbon atoms which are adjacent to each other (namely, $R^2$s or $R^3$s which are respectively binding to the adjacent carbon atoms) may bind to form an aliphatic ring.

The substituent represented by the Formula (I) is linked to a polymer main chain at the site of *.

(A) Substituent Derived from Fluoroaliphatic Compound Produced by Telomerization Process or Oligomerization Process The fluorine-substituted hydrocarbon group in the invention is preferably a substituent (fluoroaliphatic group) derived from a fluoroaliphatic compound produced by telomerization process (also referred to as telomer process) or oligomerization process (also referred to as oligomer process).

The methods for producing such fluoroaliphatic compound are described, for example, in "Fusso Kagoubutsu no Gousei to Kinou (Syntheses and Functions of Fluorine Compounds)" (supervised by Nobuo Ishikawa, published by K. K. CMC, 1987), pages 117 to 118, and "Chemistry of Organic Fluorine Compounds II" (Monograph 187, Edited by Milos Hudlicky and Attila E. Pavlath, American Chemical Society, 1995), pages 747 to 752.

The telomerization process is a method in which radical polymerization of a fluorine-containing vinyl compound such as tetrafluoroethylene is performed using an alkyl halide having a large chain transfer constant such as iodide as a telogen to synthesize a telomer.

In the invention, as the fluoroaliphatic compound synthesized by the telomer process, a fluoroaliphatic compound represented by the following formula [TM-1] is preferable.

By using such fluoroaliphatic compound as it is or after converting it to a desired monomer structure, the fluorine-substituted hydrocarbon group may be introduced into the surface-segregating polymer in the invention.

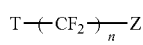

[TM-1]

In the formula [TM-1], T represents a group selected from the following Group T, Z represents a group selected from the following Group Z, and n represents an integer of 0 to 20.

When Z has a polymerizable group such as a double bond, the fluoroaliphatic compound represented by the formula [TM-1] may be used as a copolymerization component for the synthesis of the surface-segregating polymer in the invention.

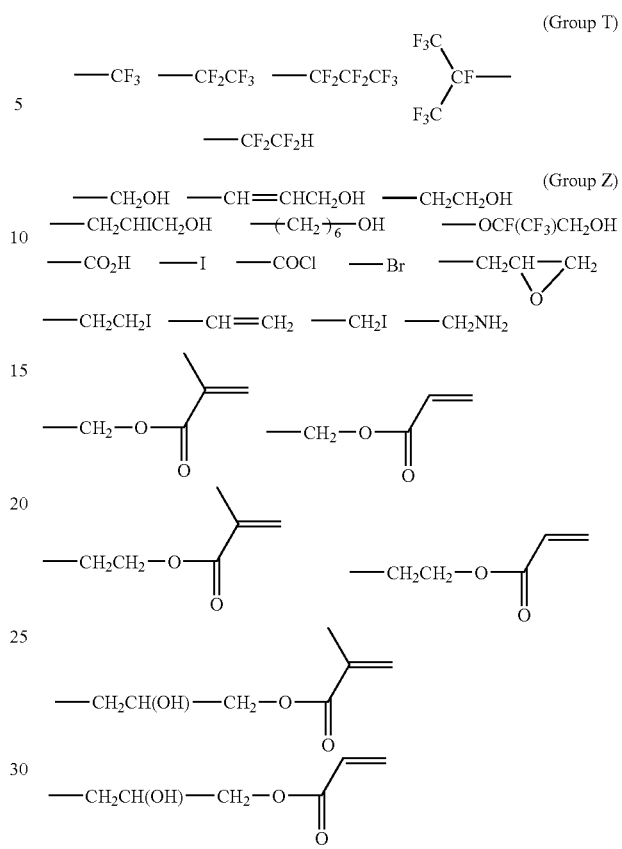

When the group represented by Z is a group selected from the following Group Z', the formula [TM-1] has a structure having an acryloyl group or a methacryloyl group at the molecular terminal. The structure is particularly preferable since the surface-segregating polymer in the invention may be obtained more conveniently from the fluoroaliphatic compound represented by the formula [TM-1] by vinyl polymerization.

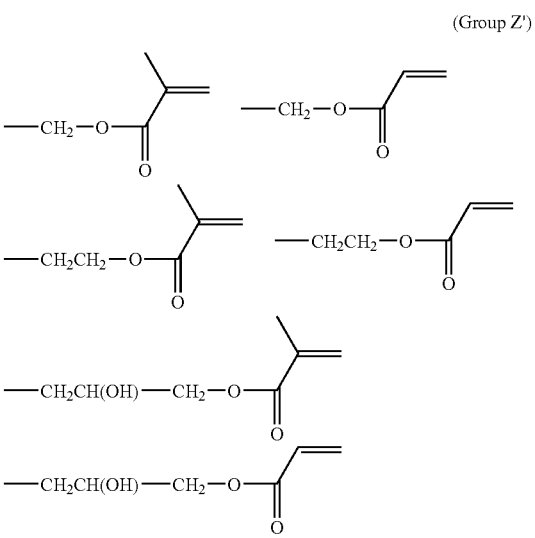

Specific examples of the compound produced by the telomer process which are preferably used for the synthesis of the surface-segregating polymer in the invention (commercial products containing the fluoroaliphatic compound represented by the formula [TM-1] as a main conponent) may include fluorine-based chemical products which are commercially available from Daikin Chemicals Sales Co., Ltd., and CHEMINOX FA, FA-M, FAAC, FAAC-M, FAMAC, FAMAC-M and the like manufactured by Nippon Mektron Ltd.

By using the fluoroaliphatic compound produced by the telomere process, a polymer having a fluoroaliphatic group at a side chain such as the surface-segregating polymer in the invention may be readily synthesized by a method known in the art.

In the invention, a substituent derived from a fluoroaliphatic compound produced by oligomerization process (oligomer process) is also preferable.

The oligomerization process is a method in which an oligomer is produced by cationic polymerization of tetrafluoroethylene in a polarity solvent such as diglyme using potassium fluoride or cesium fluoride as a catalyst. As a specific example, the following Synthesis example 1 is exemplified.

A polymer having substituents derived from the fluoroaliphatic compound (fluorine-containing hydrocarbon group) at a side chain may be synthesized from the fluoroaliphatic compound obtained by oligomer process, by utilizing a polymerizable group (unsaturated bond) and the like in the oligomer obtained by cationic polymerization, and when necessary, performing suitable chemical modification, as in the compound obtained by telomer process.

Synthesis Example 1

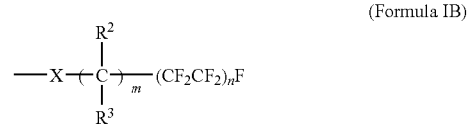

(B) Substituent Represented by Formula I

It is preferable that the surface-segregating polymer in the invention has a substituent represented by the following Formula I in view of segregation property on the ink surface.

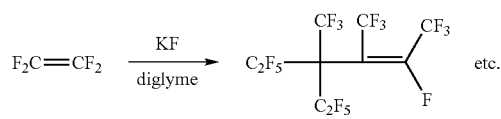

Formula I

In the Formula I, $R^2$ and $R^3$ each independently represent a hydrogen atom or an alkyl group having 1 to 4 carbon atoms, * represents a site for linking to a polymer chain, X represents a covalent bond or a bivalent linking group, m represents an integer of 0 or more, and n represents an integer of 1 or more.

When m is 2 or more, the functional groups on the carbon atoms which are adjacent to each other (namely, $R^2$s or $R^3$s which are respectively binding to the adjacent carbon atoms) may bind to form an aliphatic ring.

Among the substituents represented by the Formula I, those having "n" of 1 to 10 in the Formula I are preferable. The "n" is more preferably 1 to 4, particularly preferably 2 or 3.

That is, it is preferable that the surface-segregating polymer in the invention has a structure represented by the following Formula IB as a structure for the side chain part which is binding to a polymer main chain, and n is specifically 2 or 3 since extremely fine performance is exhibited.

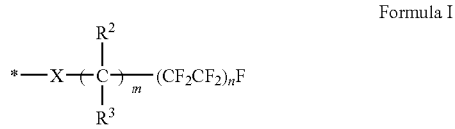

(Formula IB)

In the Formula IB, $R^2$, $R^3$, X, m and n are as defined in $R^2$, $R^3$, X, m and n for the Formula I.

In the Formulae I and IB, examples of the alkyl group having 1 to 4 carbon atoms represented by $R^2$ and $R^3$ may include a methyl group, an ethyl group, a propyl group, an isopropyl group, a n-butyl group, an isobutyl group and a tert-butyl group, preferably a hydrogen atom and a methyl group, more preferably a hydrogen atom.

In the Formulae I and IB, when X represents a covalent bond refers to that the carbon atom to which $R^2$ and $R^3$ are binding is directly linked to the polymer main chain.

When X represents a bivalent linking group, examples of the linking group may include —O—, —S—, —N($R^4$)— and —CO—. Among these, —O— is more preferable.

$R^4$ is a hydrogen atom or an alkyl group having 1 to 4 carbon atoms. Examples of the alkyl group may include a methyl group, an ethyl group, a propyl group, an isopropyl group, a n-butyl group, an isobutyl group and a tert-butyl group, preferably a hydrogen atom and a methyl group.

In the Formulae I and IB, m is an integer of 0 or more, preferably 2 to 8, particularly preferably 2.

When m is 2 or more, the functional groups on the carbon atoms which are adjacent to each other (namely, $R^2$s or $R^3$s which are each binding to the adjacent carbon atoms) may bind to form an aliphatic ring.

In the Formulae I and IB, n is an integer of 1 or more, preferably an integer of 1 to 10, more preferably an integer of 1 to 4, particularly preferably an integer of 2 or 3.

In the Formula I, * represents a site for linking to a polymer chain, and specific exemplified embodiments of the polymer main chain may include the followings.

For example, acrylic resins, methacrylic resins, styryl resins, polyester resins, polyurethane resins, polycarbonate resins, polyamide resins, polyacetal resins, phenol/formaldehyde condensation resins, polyvinylphenol resins, maleic anhydride/α-olefin resins, α-heterosubstituted methacrylic resins and the like may be used. Among them, acrylic resins, methacrylic resins, styryl resins, polyester resins and polyurethane resins are useful, and acrylic resins, methacrylic resins and polyurethane resins are specifically useful.

The surface-segregating polymer having 1) the fluorine-substituted hydrocarbon group in the invention may be readily obtained by a method known to a person skilled in the art such as condensation polymerization, addition polymerization, ring-opening polymerization or the like by suitably selecting and using, for example, (A) the monomer having a fluoroaliphatic group or (B) the monomer having the substituent represented by the Formula I (namely a monomer having a fluorine-substituted hydrocarbon group) mentioned above. Alternatively, when necessary, these monomers may be mixed.

(Monomer Having Fluorine-Substituted Hydrocarbon Group)

In the invention, it is preferable to obtain the surface-segregating polymer by using the monomer having a fluorine-substituted hydrocarbon group (hereinafter referred to as a fluorine-substituted hydrocarbon group-containing monomer), as described above.

Preferable fluorine-substituted hydrocarbon group-containing monomer may include a monomer represented by the following Formula II.

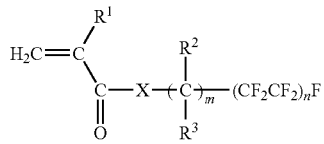

Formula II

In the formula II, $R^1$ represents a hydrogen atom, a halogen atom, a methyl group optionally having substituents or an ethyl group optionally having substituents. $R^2$, $R^3$, X, m and n are as defined in $R^2$, $R^3$, X, m and n for the Formula I, and preferable examples thereof are the same.

Examples of the halogen atom represented by $R^1$ in the Formula II may include a fluorine atom, a chlorine atom and a bromine atom.

Hereinafter the specific examples of the monomer represented by the Formula II used in the invention are shown.

Specific Examples of n=4

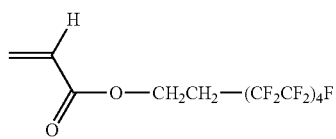
(F-1)

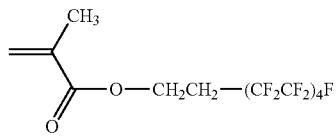
(F-2)

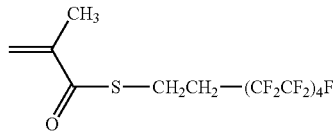
(F-3)

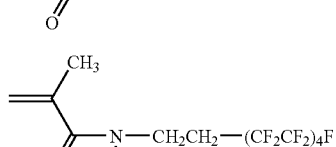
(F-4)

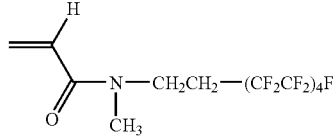
(F-5)

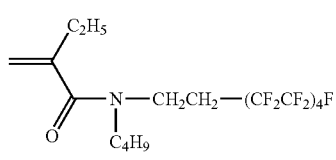
(F-6)

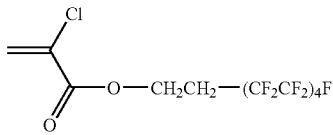
(F-7)

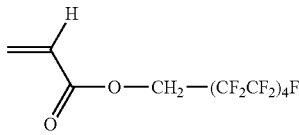
(F-8)

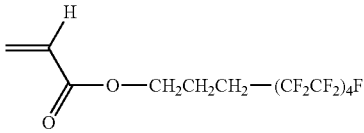
(F-9)

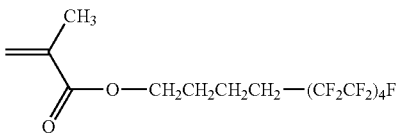
(F-10)

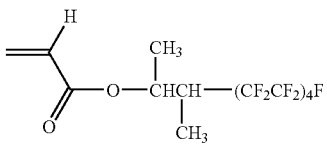
(F-11)

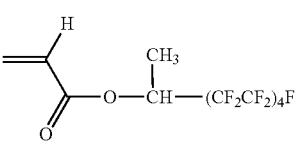
(F-12)

Specific Examples of n=3

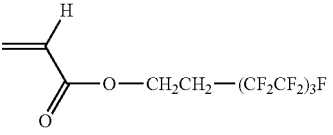
(F-13)

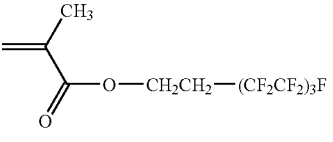
(F-14)

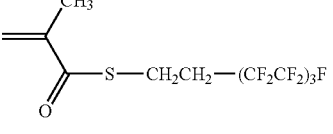
(F-15)

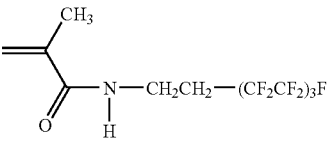
(F-16)

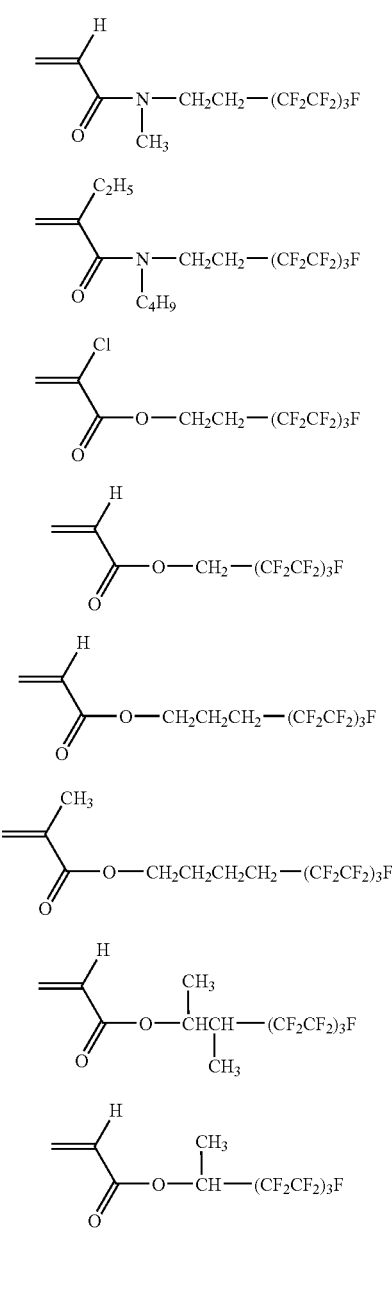
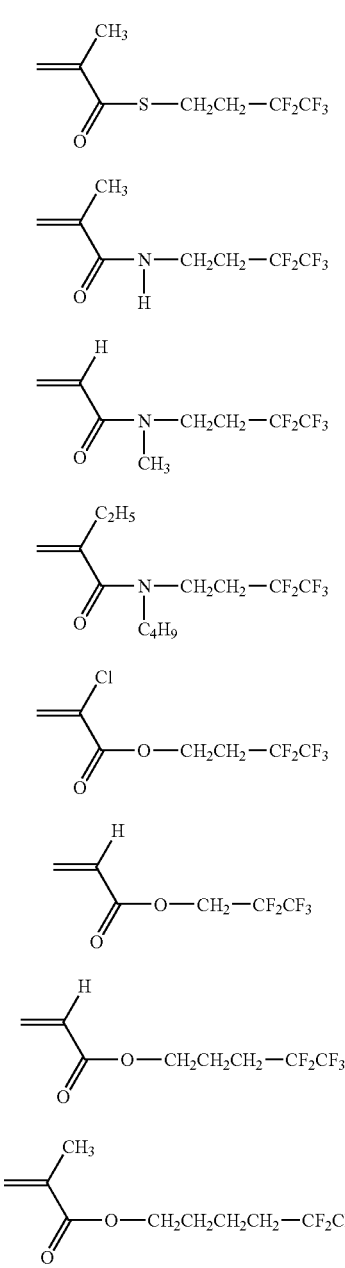
Specific Examples of n=1
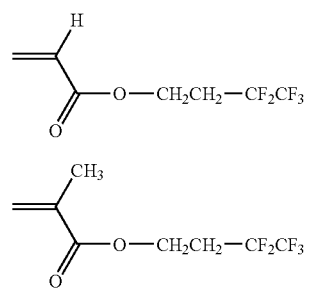
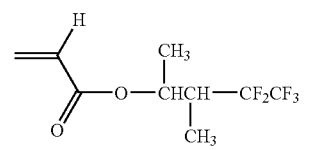
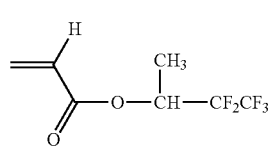

Specific Examples of n=2

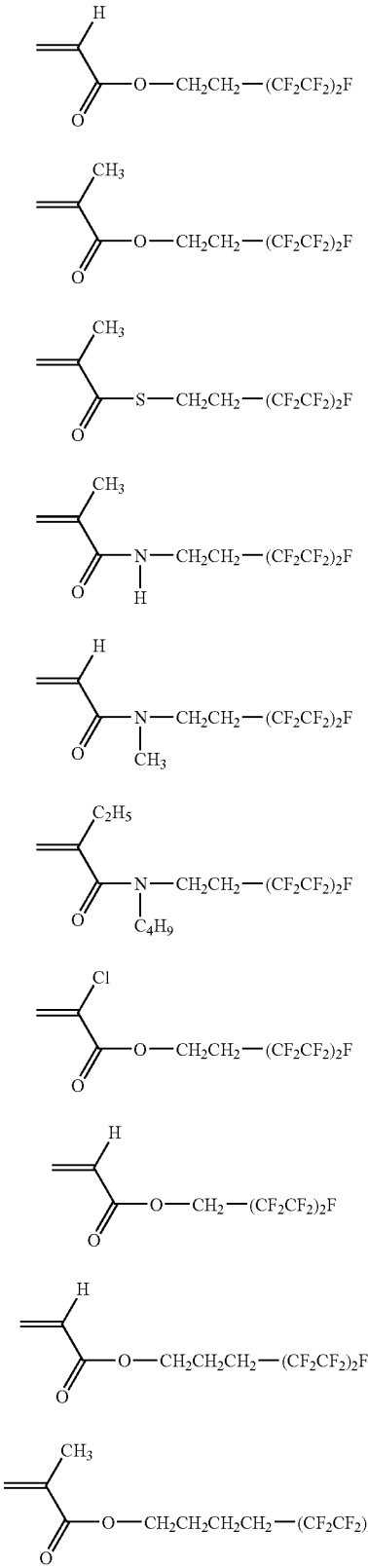

(F-37)
(F-38)
(F-39)
(F-40)
(F-41)
(F-42)
(F-43)
(F-44)
(F-45)
(F-46)

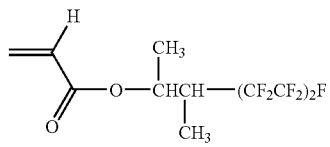

(F-47)

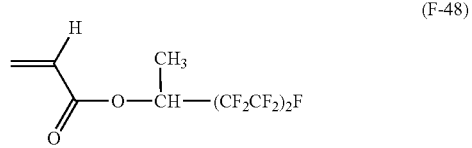

(F-48)

As the monomer used for the synthesis of the surface-segregating polymer in the invention, among the monomers represented by the Formula II, those having "n" in the Formula II of 1 to 10 are preferable. The "n" is more preferably 1 to 4, particularly preferably 2 or 3.

[2) Siloxane Backbone]

The siloxane backbone included in the surface-segregating polymer in the invention is not specifically limited as long as it has "—Si—O—Si—".

In the invention, the surface-segregating polymer having a siloxane backbone is preferably a compound including a structural unit having a siloxane skeleton at a side chain in view of improvement of the jetting stability of the ink composition, and improvement of the surface segregating property when the ink composition is formed into a coating.

The siloxane compound which is useful for introducing the siloxane skeleton into the molecule of the surface-segregating polymer may be available as a commercial product, and examples thereof may include monoterminal reactive silicones including X-22-173DX and X-22-173BX (trade name, manufactured by Shin-Etsu Chemical Co., Ltd.).

Alternatively, the siloxane compound may be synthesized by reacting a siloxane having a reactive terminal and a compound having a cation polymerizable group. For example, it may be synthesized from a compound having a monoterminal hydroxy group such as SILAPLANE series FM-0411, FM-0421 and FM-0425 (trade names, manufactured by Chisso Corporation) and epichlorohydrin, or by the method described in JP-A No. 11-80315.

Examples of the siloxane skeleton in the invention may include, but are not limited to, the following structures.

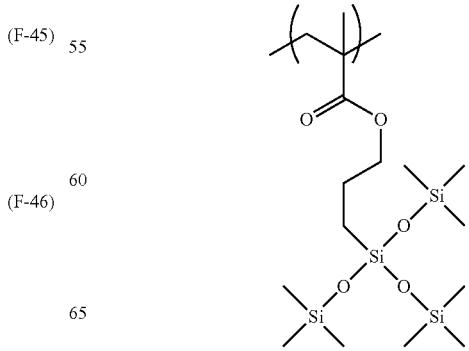

(a2-7)

(a2-8)

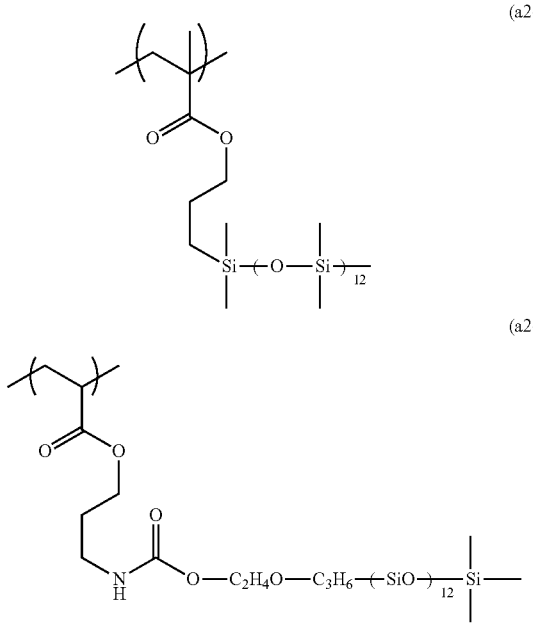

(a2-9)

[3] Long Chain Alkyl Group]

The long chain alkyl group 3) included in the surface-segregating polymer in the invention is preferably an alkyl group having 6 or more carbon atoms, which may be a straight chain, a branched chain or a ring, more preferably a straight chain. The number of the carbon atoms is preferably 6 to 40, more preferably 6 to 18, and further preferably 6 to 12.

The alkyl group having 6 or more carbon atoms existing at a side chain in the surface-segregating polymer is a substituent represented by $-C_nH_{2n+1}$ in the following Formula III, and is preferably introduced into a polymer by incorporating the structural unit represented by the Formula III.

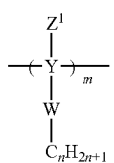
(III)

In the Formula (III), n represents an integer of 6 to 40, preferably 6 to 18, more preferably 6 to 12 in view of segregatability. The m represents the number of the structural unit represented by the Formula (III).

Y represents a polymer main chain, and $-C_nH_{2n+1}$ (an alkyl group having 6 or more carbon atoms) binds to the polymer main chain directly or via a linking group.

W represents a single bond or a linking group, and where W represents a single bond, the long chain alkyl directly binds to the polymer main chain. $Z^1$ represents a hydrogen atom or a monovalent substituent.

The structural unit may have plural alkyl groups having 6 or more carbon atoms in the Formula (III). In such case, the structural unit may be an exemplary embodiment in which an alkyl group having 6 or more carbon atoms is linked via the linking group W at the position of $Z^1$, or an exemplary embodiment in which the linking group W has a branched structure or a ring structure and other alkyl group having 6 or more carbon atoms is linked to the terminal of any carbon atom which constitutes W.

Examples of W may include a straight chain or a branched chain or a cyclic alkylene group having 1 to 20 carbon atoms, a straight chain or branched chain or cyclic alkenylene group having 2 to 20 carbon atoms, an alkynyl group having 2 to 20 carbon atoms, an arylene group having 6 to 20 carbon atoms (monocyclic or heterocyclic), —OC(=O)—, —OC(=O)Ar—, —OC(=O)O—, —OC(=O)OAr—, —C(=O)NR—, —C(=O)NAr—, —SO$_2$NR—, —SO$_2$NAr—, —O-(alkyleneoxy or polyalkyleneoxy), —OAr-(aryleneoxy or polyaryleneoxy), —C(=O)O—, —C(=O)O—Ar—, —C(=O)Ar—, —C(=O)—, —SO$_2$O—, —SO$_2$OAr—, —OSO$_2$—, —OSO$_2$Ar—, —NRSO$_2$—, —NArSO$_2$—, —NRC(=O)—, —NArC(=O)—, —NRC(=O)O—, —NArC(=O)O—, —OC(=O)NR—, —OC(=O)NAr—, —NAr—, —NR—, —N+RR'—, —N+RAr—, —N+ArAr'—, —S—, —SAr—, —ArS—, a heterocyclic group (a 3- to 12-membered monocycle or condensed ring containing at least one heteroatoms including nitrogen, oxygen and sulfur), —OC(=S)—, —OC(=S)Ar—, —C(=S)O—, —C(=S)OAr—, —C(=S)OAr—, —C(=O)S—, —C(=O)SAr—, —ArC(=O)—, —ArC(=O)NR—, —ArC(=O)NAr—, —ArC(=O)O—, —ArC(=O)O—, —ArC(=O)S—, —ArC(=S)O—, —ArO— and —ArNR—.

R and R' each independently represent a hydrogen atom, a straight chain or branched chain alkyl group, a chain or cyclic alkyl group, a straight chain or branched chain alkenyl group, a chain or cyclic alkenyl group, a straight chain or branched chain alkynyl group, a chain or cyclic alkynyl group, and Ar and Ar' each independently represent an aryl group.

Among these linking groups, an arylene group having 6 to 20 carbon atoms (monocycle or heterocycle), —C(=O)NR—, —C(=O)NAr—, —O-(alkyleneoxy or polyalkyleneoxy), —OAr-(aryleneoxy or polyaryleneoxy), —C(=O)O—, —C(=O)O—Ar—, —C(=O)—, —C(=O)Ar—, —S—, —SAr—, —ArS—, —ArC(=O)—, —ArC(=O)O—, —ArC(=O)O—, —ArO—, —ArNR— and the like are preferable, and an arylene group having 6 to 20 carbon atoms (monocycle or heterocycle), —C(=O)NR—, —C(=O)NAr—, —O-(alkyleneoxy or polyalkyleneoxy), —OAr-(aryleneoxy or polyaryleneoxy), —C(=O)O—, —C(=O)O—Ar—, —SAr—, —ArS—, —ArC(=O)—, —ArC(=O)O—, —ArC(=O)O—, —ArO—, —ArNR— and the like are more preferable.

Alternatively, in the invention, the linking group represented by W may be a combination of two or more kinds of the linking groups listed here.

Hereinafter, examples of such bivalent substituent represented by W are listed, which are particularly preferable in view of segregability on the ink surface, but the invention is not limited by these examples.

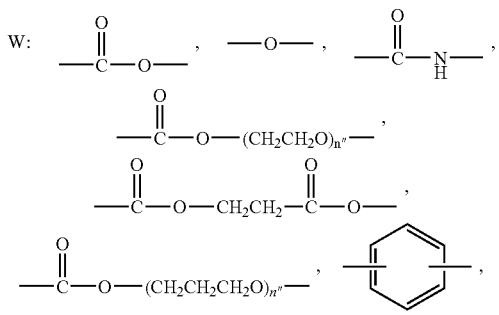

-continued

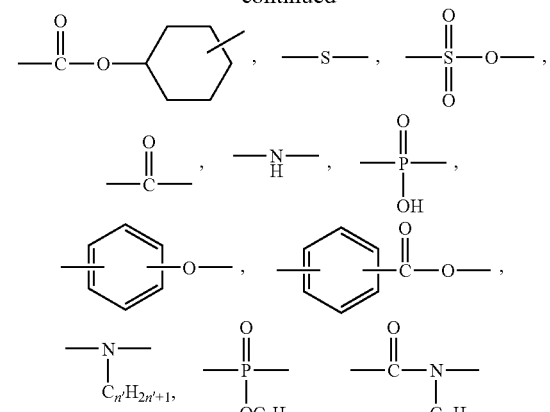

(n' = 1~40, n'' = 1~20)

Furthermore, the groups as listed below may also be preferably exemplified as $Z^1$ besides an exemplary embodiment in which a long chain alkyl group is linked via the linking group W. Here, by adjusting m to 6 or more and 20 or less, such exemplary embodiments may have a long chain alkyl group.

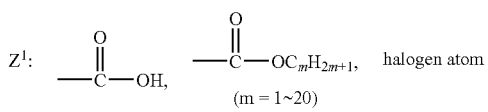

(m = 1~20)

Specific examples of the structural unit having a long chain alkyl group which constitutes the surface-segregating polymer in the invention are listed below, but the invention is not limited to these examples.

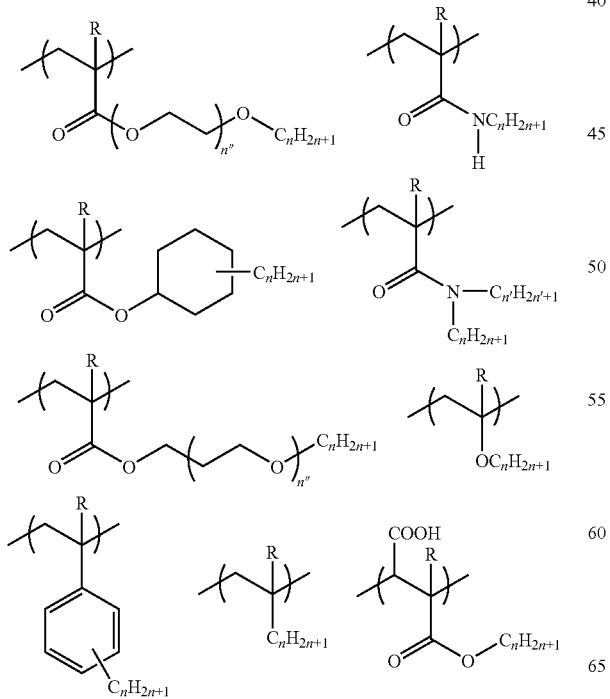

-continued

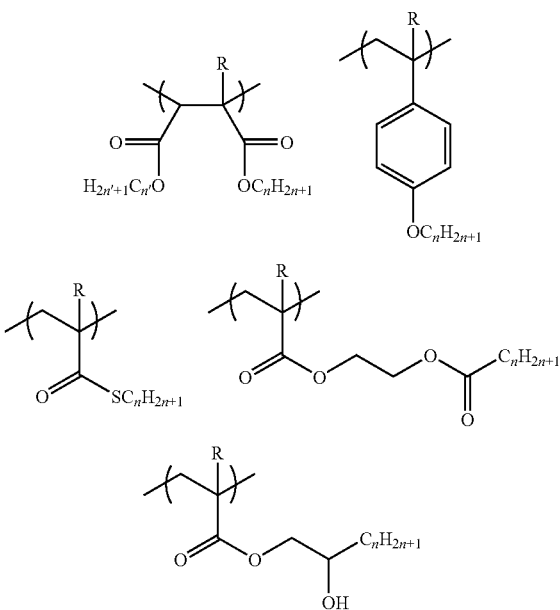

wherein R represents a hydrogen atom or a methyl group.
n=6 to 40, n'=1 to 40, n''=1 to 20

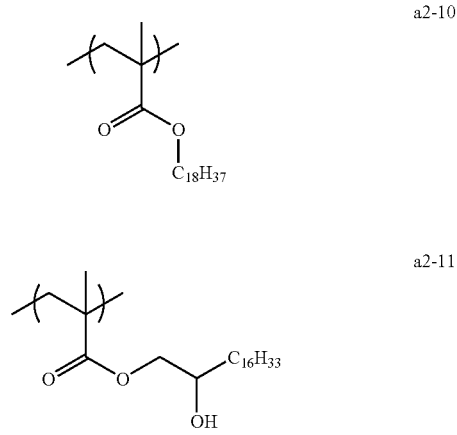

wherein R represents a hydrogen atom or a methyl group.
n=6 to 40, n'=1 to 40.

a2-10 a2-11

-continued a2-12

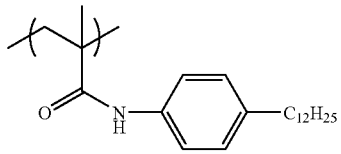

The content of the partial structure selected from the group consisting of 1) the fluorine-substituted hydrocarbon group, 2) the siloxane skeleton and 3) the long chain alkyl group in the surface-segregating polymer for the invention is preferably 3% by weight to 60% by weight, more preferably 3% by weight to 50% by weight, and further preferably 5% by weight to 40% by weight.

In the above-mentioned range, the surface-segregating polymer may be efficiently surface-segregated in the ink composition.

Furthermore, the total content of the specific sites when two or more partial structures selected from the group consisting of 1) the fluorine-substituted hydrocarbon group, 2) the siloxane skeleton and 3) the long chain alkyl group are contained is 3% by weight to 60% by weight, more preferably 3% by weight to 50% by weight, and further preferably 5% by weight to 40% by weight with respect to the surface-segregating polymer.

The content of the partial structure selected from the group consisting of 1) the fluorine-substituted hydrocarbon group, 2) the siloxane skeleton and 3) the long chain alkyl group in the total solid content in the ink composition of the invention is preferably 0.1% by weight to 20% by weight, more preferably 0.5% by weight to 15% by weight, and further preferably 1% by weight to 10% by weight. By adjusting the content to the above-mentioned range, surface curability and blocking suppression become excellent, and a surface tension which allows jetting (22 mN/m to 28 mN/m) and a suitable viscosity may be obtained.

[Radical Polymerizable Group]

The surface-segregating polymer in the invention may have radical polymerizable group at a side chain.

Since the surface-segregating polymer contains a radical polymerizable group, the surface of the cured film of the ink composition may be coated with the polymer more strongly. Therefore, even when volatile components remain in the cured film, bleeding and elution from the cured film may be prevented, whereby tackiness of the surface of a substrate on which an image has been printed is suppressed, and blocking property is improved.

This is considered to be due to that the surface-segregating polymer segregates on the surface of the film when the film is formed by applying the ink composition on the substrate and the polymerizable groups in the surface-segregating polymer are polymerized, whereby the surface of the film is coated with the cured surface-segregating polymer.

Examples of the radical polymerizable group may include a polymerizable group having a radical polymerizable ethylenic unsaturated bond.

Examples of the polymerizable group having a radical polymerizable ethylenic unsaturated bond may include unsaturated carboxylic acid esters such as an acrylic acid ester group, a methacrylic acid ester group, an itaconic acid ester group, a crotonic acid ester group, an isocrotonic acid ester group and a maleic acid ester group, and radical polymerizable groups such as a styrene group. Among these, a methacrylic acid ester group and an acrylic acid ester group are preferable.

The content of the radical polymerizable group is preferably 5 mol % to 90 mol %, more preferably 5 mol % to 85 mol %, and further preferably 10 mol % to 80 mol % in the surface-segregating polymer.

Examples of the method for introducing the radical polymerizable groups into the surface-segregating polymer include a method including using a monomer obtained by sealing reactions by using a protective group at the double bond of the radical polymerizable group, co-polymerizing the monomer and removing the protective group to form a radical polymerizable group (double bond), and a method including introducing a low molecular compound having a radical polymerizable group into the surface-segregating polymer by polymer reaction.

Hereinafter specific examples of the radical polymerizable group are shown, but the invention should not be limited by these specific examples.

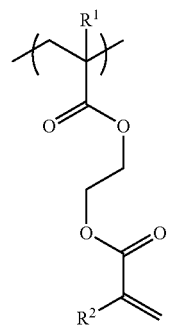

$R^1 = H, R^2 = H$ (a3-1)
$R^1 = H, R^2 = CH_3$ (a3-2)
$R^1 = CH_3, R^2 = H$ (a3-3)
$R^1 = CH_3, R^2 = CH_3$ (a3-4)

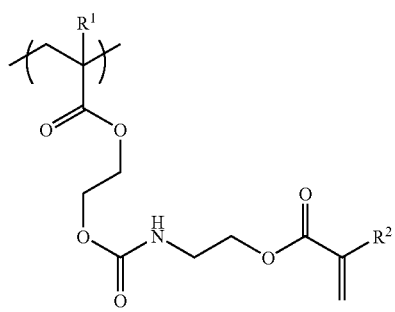

$R^1 = H, R^2 = H$ (a3-5)
$R^1 = H, R^2 = CH_3$ (a3-6)
$R^1 = CH_3, R^2 = H$ (a3-7)
$R^1 = CH_3, R^2 = CH_3$ (a3-8)

-continued

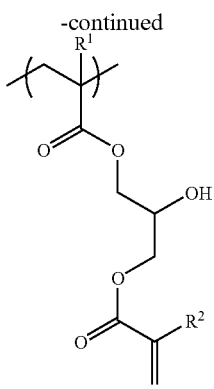

R¹ = H, R² = H (a3-9)
R¹ = H, R² = CH₃ (a3-10)
R¹ = CH₃, R² = H (a3-11)
R¹ = CH₃, R² = CH₃ (a3-12)

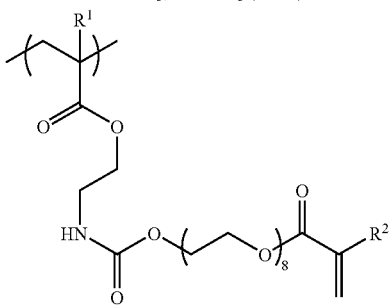

R¹ = H, R² = H (a3-13)
R¹ = H, R² = CH₃ (a3-14)
R¹ = CH₃, R² = H (a3-15)
R¹ = CH₃, R² = CH₃ (a3-16)

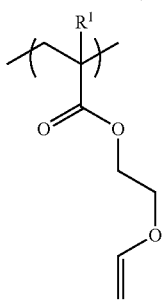

R¹ = H (a3-17)
R¹ = H (a3-18)

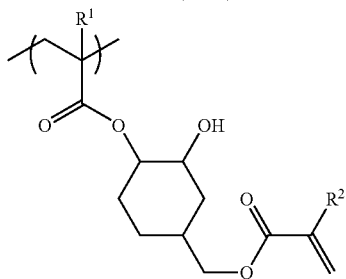

R¹ = H, R² = H (a3-19)
R¹ = H, R² = CH₃ (a3-20)
R¹ = CH₃, R² = H (a3-21)
R¹ = CH₃, R² = CH₃ (a3-22)

The surface-segregating polymer in the invention may include a copolymerization component (other copolymerization component) having a structure other than that of the partial structure selected from the group consisting of 1) the fluorine-substituted hydrocarbon group, 2) the siloxane skeleton and 3) the long chain alkyl group fluorine-substituted hydrocarbon group, and the structure of the radical polymerizable group. It is preferable to use the other copolymerization component in view of improvement of solubility in the ink composition and improvement of blocking property by controlling Tg of the polymer.

Although the other copolymerization component is not specifically limited as long as it is derived from a radical polymerizable monomer, it is preferably a monomer having an unsaturated double bond, specifically an acrylate or a methacrylate in view of copolymerizability, and solubility of the produced polymer in the ink composition. The preferable content of the other copolymerization component in the surface-segregating polymer is 0 mol % to 70 mol %, more preferably 0 mol % to 50 mol %, and the most preferably 0 mol % to 30 mol %.

The preferable exemplary embodiment of the surface-segregating polymer as a main chain structure included in the ink composition of the invention is a methacrylic resin or an acrylic resin.

Furthermore, in a preferable exemplary embodiment, the main chain structure of the surface-segregating polymer is synthesized by radical chain polymerization. Alternatively, a polymer comprising main urethane structures or urea structures as repeating units in the main chain structure is also one of the preferable exemplary embodiments.

The weight average molecular weight of the surface-segregating polymer is preferably 5,000 to 200,000, more preferably 5,000 to 100,000, further preferably 5,000 to 80,000. The weight average molecular weight in the above-mentioned range may provide a suitable viscosity, and is fine in view of curing characteristics.

Hereinafter the preferable specific examples (a-1 to a-22) of the surface-segregating polymer in the invention are listed. However, the invention is not limited to these specific examples at all.

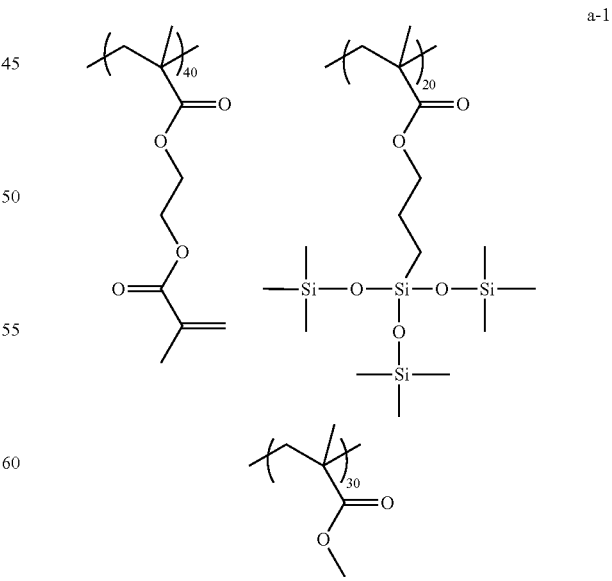

a-1

Mw = 28000 a-2
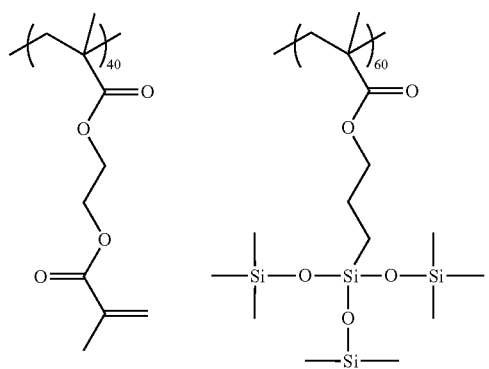
Mw = 30000
a-3
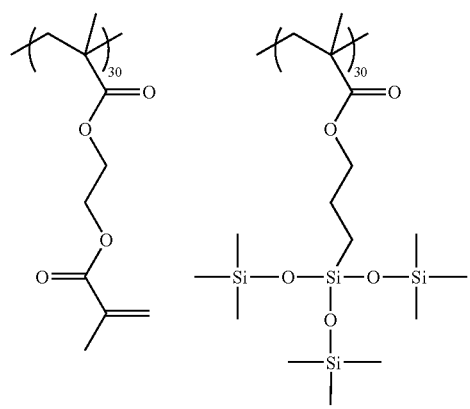
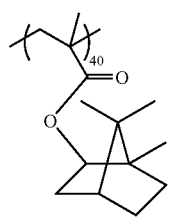
Mw = 30000
a-4
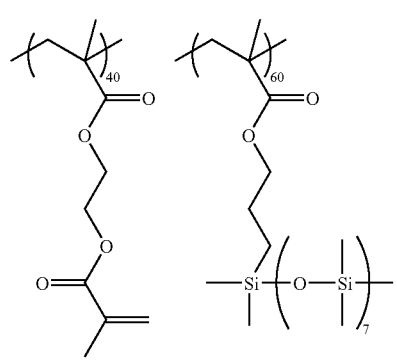
Mw = 33000
a-5
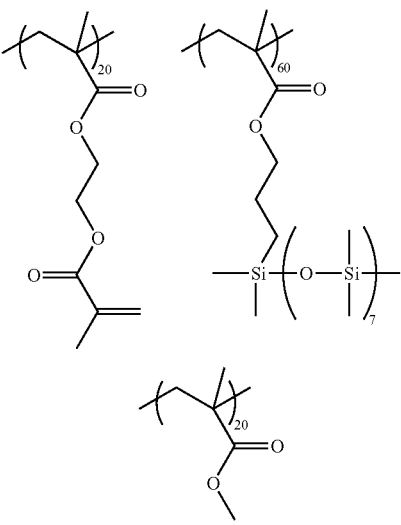
Mw = 43000
a-6
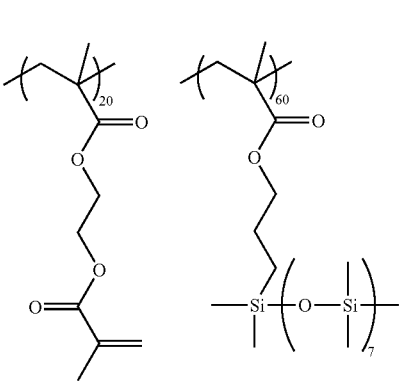
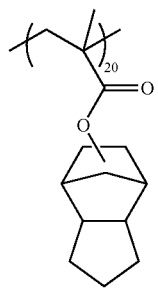
Mw = 35000
a-7
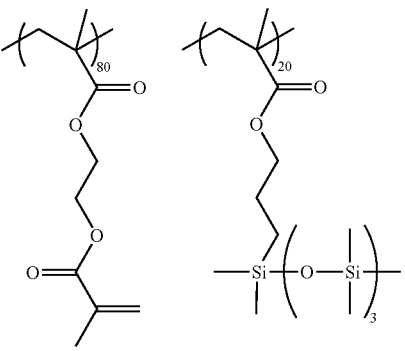
Mw = 30000 a-8
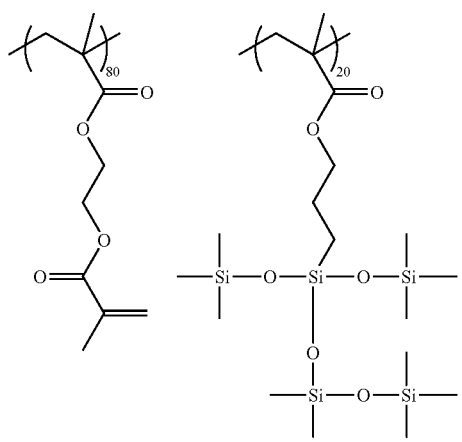
Mw = 28000
a-9
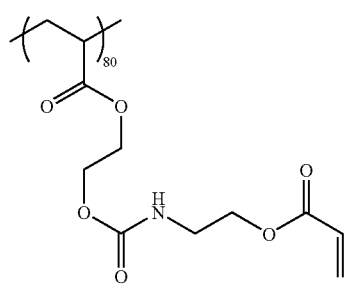
Mw = 25000
a-10
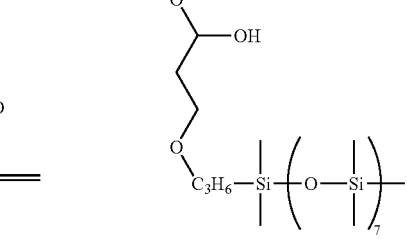
Mw = 40000
a-11
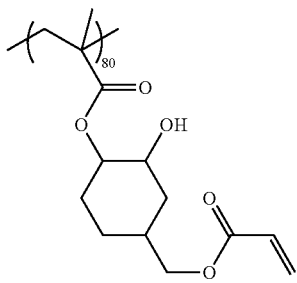
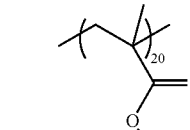
Mw = 38000
a-12
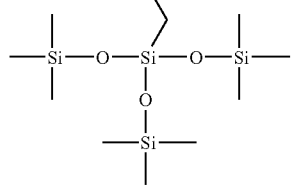
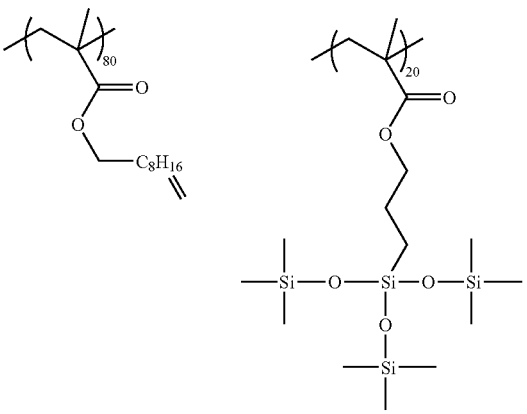
Mw = 28000
a-13
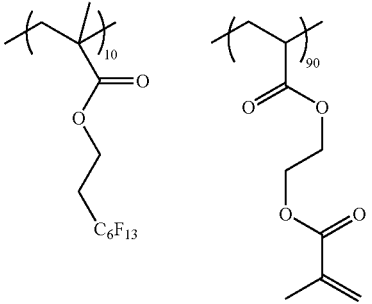
Mw = 46000

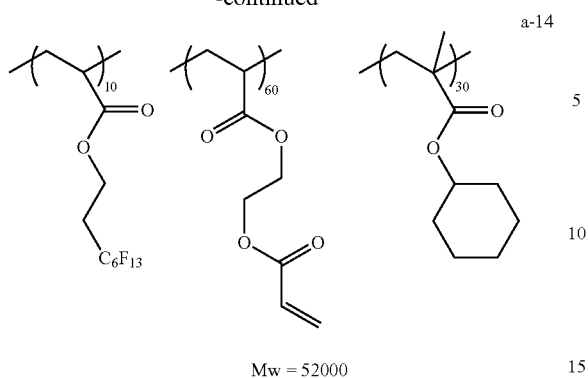
a-14
Mw = 52000
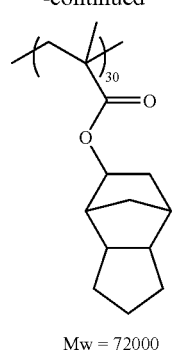
Mw = 72000
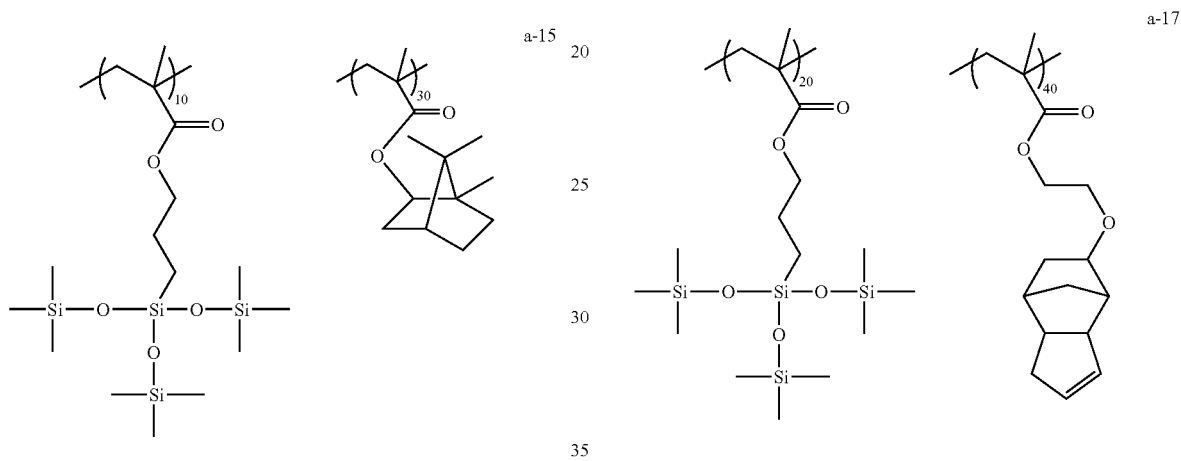
a-15
a-17
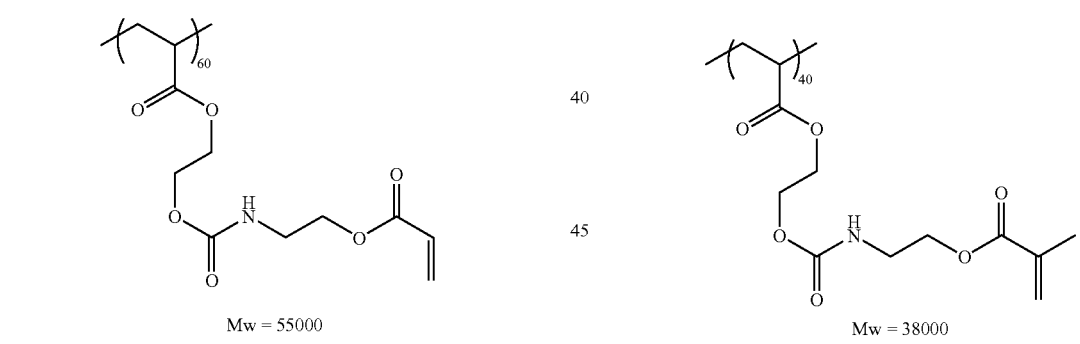
Mw = 55000
Mw = 38000
a-16
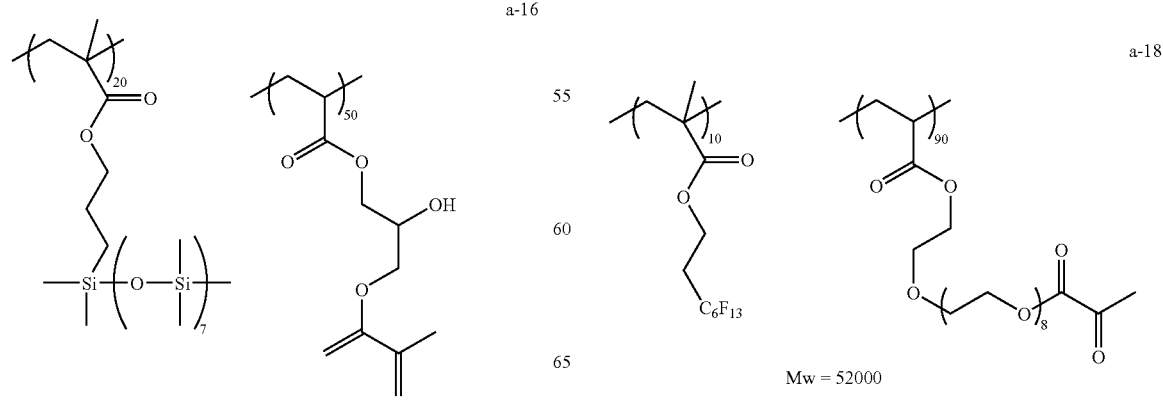
a-18
Mw = 52000

-continued

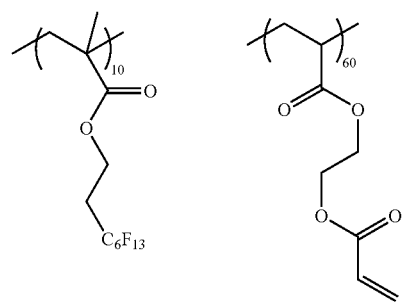

a-19

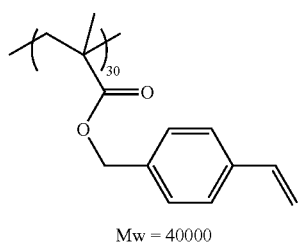

Mw = 40000 a-20

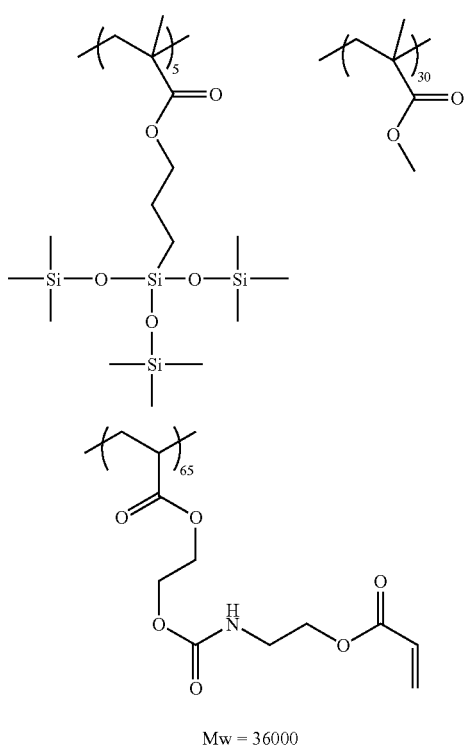

Mw = 36000 a-21

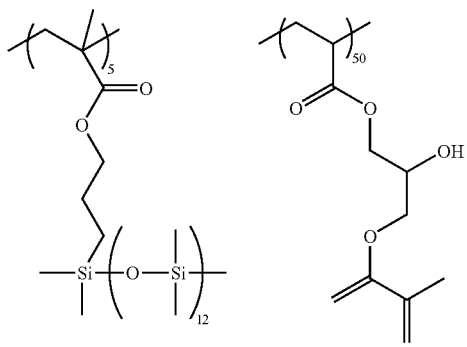

-continued

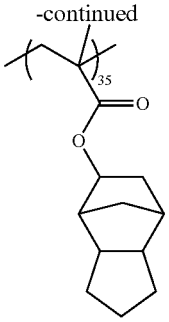

Mw = 28000 a-22

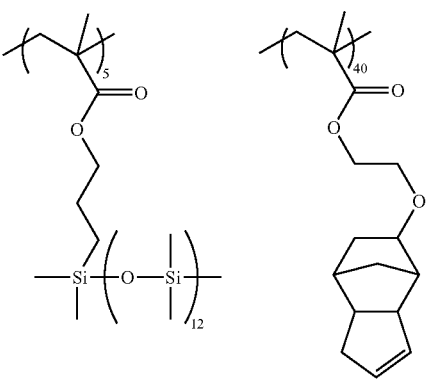

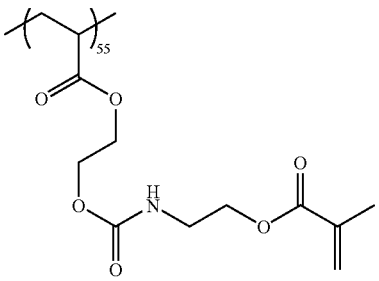

Mw = 35000

A commercial product may be used as the surface-segregating polymer, and examples may include BYK-UV3500 (a polydimethylsiloxane having polyether-modified acrylic group), BYK-UV3510 (a polyether-modified polydimethylsiloxane) and BYK-UV3570 (a polydimethylsiloxane having polyester-modified acrylic group) which are manufactured by BYK-Chemie.

The content of the surface segregating polymer contained the ink composition of the invention is preferably 0.03% by weight to 5% by weight, more preferably 0.1% by weight to 4% by weight, and further preferably 0.5% by weight to 2% by weight in the total solid content in the ink composition.

[Other Component]

(Colorant)

The ink composition of the invention may contain a colorant according to the purpose. By adding a colorant to the ink composition, an ink composition which may form visible images (colored images) may be obtained.

The colorant which may be used for the ink composition of the invention is not specifically limited, and known various colorants (pigments and dyes) may be suitably selected and used according to the purpose. For example, when an image having excellent weather resistance is to be formed, a pigment is preferable. As the dye, both water-soluble dyes and oil-soluble dyes may be used, but oil-soluble dyes are preferable.

—Pigment—

First, a pigment preferably used as a colorant for the ink composition of the invention is described. When a pigment is used as a colorant, a colored image formed by using the ink composition has excellent light resistance.

The pigment is not specifically limited, and all organic pigments and inorganic pigments, and those obtained by dispersing a pigment in an insoluble resin or the like as a dispersion medium, or those obtained by grafting a resin on the surface of a pigment may be used. Furthermore, resin particles which have been stained with a dye, or the like may be used.

Examples of these pigments may include the pigments described in Seishiro Ito ed., "Encyclopedia of Pigments" (published on 2000), W. Herbst, K. Hunger "Industrial Organic Pigments", and JP-A Nos. 2002-12607, 2002-188025, 2003-26978 and 2003-342503.

Specific examples of the organic pigments and inorganic pigments which may be used in the invention may include the compounds described in [0126] to [0131] of JP-A No. 2008-13646, and these may also be applied to the invention.

For dispersing the pigment, disperse apparatuses including a ball mill, a sand mill, an attriter, a roll mill, a jet mill, a homogenizer, a paint shaker, a kneader, an agitator, a Henschell mixer, a colloid mill, an ultrasonic homogenizer, a pearl mill and a wet jet mill may be used.

During dispersion of the pigment, a dispersing agent may be added. Examples of the dispersing agent may include a hydroxyl group-containing carboxylic acid ester, a salt of a long chain polyaminoamide with a high molecular weight acid ester, a salt of a high molecular weight polycarboxylic acid, a high molecular weight unsaturated acid ester, a high molecular weight copolymer, a modified polyacrylate, an aliphatic polyvalent carboxylic acid, a condensate of naphthalenesulfonic acid with formalin, a polyoxyethylene alkyl phosphonic acid ester and a pigment derivatives. Alternatively, it is also preferable to use a commercially available polymer dispersing agent such as SOLSPERSE series (trade name, manufactured by Lubrizol Corporation).

Furthermore, it is also possible to use a synergist corresponding to the pigment as a dispersion aid. It is preferable that the dispersing agent and dispersion aid are added by 1 part by weight to 50 parts by weight with respect to 100 parts by weight of the pigment.

In the ink composition, a solvent may be added as a dispersion medium for the components such as a pigment. Alternatively, the polymerizable compound, which is a low molecular weight component, may be used as a dispersion medium without using a solvent. It is preferable to not use a solvent since the ink composition of the invention is an ink which is cured by radiation, and the ink is applied on a medium to be recorded and cured. This is because when a solvent remains in a cured ink image, solvent resistance may be deteriorated and a problem of VOC (Volatile Organic Compound) of the remained solvent may arise. From such viewpoints, it is preferable to use a polymerizable compound as a dispersion medium, and it is particularly preferable to select a cation polymerizable monomer having the lowest viscosity in view of improvement of dispersing suitability and handling property of the ink composition.

The volume average particle size of the pigment particles in the ink composition is preferably 0.02 μm to 0.60 μm, more preferably 0.02 μm to 0.10 μm. The maximum particle size is preferably 3 μm or less, more preferably 1 μm or less, and selection of the pigment, dispersing agent and dispersing medium, and dispersion condition and filtering condition are set so that the maximum particle size falls within such range. By this control of the particle size, clogging of head nozzles may be suppressed, and storage stability of the ink, transparency of the ink and curing sensitivity may be maintained.

—Dye—

Next, the dye which is preferably used as a colorant in the invention is described.

The dye may be suitably selected and used from conventionally-known compounds (dyes). Specific examples may include the compounds described in paragraphs [0023] to [0089] of JP-A No. 2002-114930, paragraphs [0136] to [0140] of JP-A No. 2008-13646 and the like, and these may also be applied to the invention.

The colorant is added to the ink composition by preferably 0.05% by weight to 20% by weight, more preferably 0.2% by weight to 10% by weight with respect to the total weight of the ink composition. When an oil-soluble dye is used as a colorant, it is preferably 0.2% by weight to 6% by weight with respect to the total weight (including solvent) of the ink composition.

(Cosensitizer)

The ink composition of the invention may include a cosensitizer. In the invention, the cosensitizer has a function of further improving the sensitivity of the sensitizing dye to radioactive ray, or a function of suppressing inhibition by oxygen of polymerization of the polymerizable compound, or the like.

Examples of such cosensitizer may include amines such as the compounds described in M. R. Sander et al., "Journal of Polymer Science", Vol. 10, p. 3173 (1972), JP-B No. 44-20189, JP-A Nos. 51-82102, 52-134692, 59-138205, 60-84305, 62-18537 and 64-33104, and Research Disclosure No. 33825, and specific examples include triethanolamine, p-dimethylaminobenzoic acid ethyl ester, p-formyldimethylaniline and p-methylthiodimethylaniline.

Other examples of the cosensitizer include thiols and sulfides such as the thiol compounds described in JP-A No. 53-702, JP-B No. 55-500806 and JP-A No. 5-142772, and the disulfide compounds of JP-A No. 56-75643, and specific examples include 2-mercaptobenzothiazole, 2-mercaptobenzoxazole, 2-mercaptobenzimidazole, 2-mercapto-4(3H)-quinazoline and β-mercaptonaphthalene.

Yet other examples of the cosensitizer include amino acid compounds (e.g. N-phenylglycine, etc.), the organometallic compounds described in JP-B No. 48-42965 (e.g. tributyltin acetate, etc.), the hydrogen-donating compounds described in JP-B No. 55-34414, the sulfur compounds described in JP-A No. 6-308727 (e.g. trithiane, etc.), the phosphorus compounds described in JP-A No. 6-250387 (diethylphosphite, etc.), and Si—H and Ge—H compounds.

(Ultraviolet Absorber)

An ultraviolet absorber may be used in the ink composition of the invention in view of improvement of the weather resistance of the image obtained and prevention of discoloration.

Examples of the ultraviolet absorbers include the benzotriazole compounds described in JP-A Nos. 58-185677, 61-190537, 2-782, 5-197075 and 9-34057; the benzophenone compounds described in JP-A Nos. 46-2784 and 5-194483 and U.S. Pat. No. 3,214,463; the cinnamic acid compounds described in JP-B Nos. 48-30492 and 56-21141 and JP-A-10-88106; the triazine compounds described in JP-A Nos. 4-298503, 8-53427, 8-239368 and 10-182621 and Japanese national phase patent publication No. 8-501291; the compounds described in Research Disclosure No. 24239; and compounds which absorb ultraviolet ray to emit fluorescence, so-called fluorescent brightening agents including stilbene and benzoxazole compounds.

The amount to be added is appropriately selected according to the intended application, and it is generally from 0.5 to 15% by weight on the basis of the solid content.

(Antioxidant)

In order to improve the stability of the ink composition, an antioxidant may be added. Examples of the antioxidant include those described in European Patent Laid-open Nos. 223739, 309401, 309402, 310551, 310552 and 459416, German Patent Laid-open No. 3435443, JP-A Nos. 54-48535, 62-262047, 63-113536, 63-163351, 2-262654, 2-71262, 3-121449, 5-61166 and 5-119449, and U.S. Pat. Nos. 4,814, 262 and 4,980,275.

The amount to be added is appropriately selected according to the intended application, and it is generally from 0.1% by weight to 8% by weight on the basis of the solid content.

(Antifading Agent)

The ink composition of the invention may employ various organic and metal complex antifading agents.

Examples of the organic antifading agents include hydroquinones, alkoxyphenols, dialkoxyphenols, phenols, anilines, amines, indanes, chromans, alkoxyanilines and heterocycles.

Examples of the metal complex antifading agents include nickel complexes and zinc complexes. More specifically, the compounds described in the patents cited in Research Disclosure, No. 17643, Items VII-I to J, Research Disclosure, No. 15162, Research Disclosure, No. 18716, page 650, left-hand column, Research Disclosure, No. 36544, page 527, Research Disclosure, No. 307105, page 872, and Research Disclosure, No. 15162, and the compounds contained in the formulae and compound examples of the typical compounds described in JP-A No. 62-215272, pages 127 to 137 may be used.

The amount to be added is appropriately selected according to the intended application, and it is generally from 0.1% by weight to 8% by weight on the basis of the solid content.

(Electroconductive Salt)

The ink composition of the invention may contain, for the purpose of controlling jetting property, an electroconductive salt such as potassium thiocyanate, lithium nitrate, ammonium thiocyanate or dimethylamine hydrochloride.

(Solvent)

A trace amount of organic solvent may be added to the ink composition of the invention in order to improve adhesibility to a medium to be recorded (substrate).

Examples of the solvent may include ketone-based solvents such as acetone, methyl ethyl ketone and diethyl ketone; alcohol-based solvents such as methanol, ethanol, 2-propanol, 1-propanol, 1-butanol and tert-butanol; chlorine-based solvents such as g chloroform and methylene chloride; aromatic-based solvents such as benzene and toluene; ester-based solvents including ethyl acetate, butyl acetate and isopropyl acetate; ether-based solvents such as diethyl ether, tetrahydrofuran and dioxane; and glycol ether-based solvents such as ethylene glycol monomethyl ether and ethylene glycol dimethyl ether.

In this case, it is effective if the amount to be added is in a range which does not cause a problem of solvent resistance or VOC, and the amount is preferably in the range of 0.1% by weight to 5% by weight, more preferably 0.1% by weight to 3% by weight relative to the total amount of the ink composition.

(Polymer Compound)

The ink composition of the invention may contain various types of polymer compounds in order to adjust physical properties of the film.

Examples of the polymer compounds which may be used may include acrylic polymers, polyvinyl butyral resins, polyurethane resins, polyamide resins, polyester resins, epoxy resins, phenol resins, polycarbonate resins, polyvinyl butyral resins, polyvinyl formal resins, shellac, vinyl resins, acrylic resins, rubber-based resins, waxes and other natural resins. They may be used as a combination of two or more kinds Among these, a vinyl copolymer obtained by copolymerization of an acrylic monomer is preferable. Furthermore, as a copolymer component of the polymer compound, a copolymer containing as a structural unit a "carboxyl group-containing monomer", an "alkyl methacrylic acid ester" or an "alkyl acrylic acid ester" may preferably be used.

(Surfactant)

A surfactant may be added to the ink composition of the invention.

Examples of the surfactant may include those described in JP-A Nos. 62-173463 and 62-183457. Examples thereof may include anionic surfactants such as dialkylsulfosuccinic acid salts, alkylnaphthalenesulfonic acid salts and fatty acid salts, nonionic surfactants such as polyoxyethylene alkyl ethers, polyoxyethylene alkyl allyl ethers, acetylene glycols and polyoxyethylene/polyoxypropylene block copolymers, and cationic surfactants such as alkylamine salts and quaternary ammonium salts.

An organofluoro compound may be used instead of the surfactants.

The organofluoro compound is preferably hydrophobic. Examples of the organofluoro compound may include fluorine-based surfactants, oil-like fluorine-based compounds (e.g. fluorine oil), solid fluorine compound resins (e.g. tetrafluoroethylene resin) and those described in JP-B No. 57-9053 (columns 8 to 17) and JP-A No. 62-135826.

(Other Additives)

Besides the above, the ink composition of the invention may contain, if necessary, for example, a leveling additive, a matting agent, a wax for adjusting physical properties of the film, and a tackifler which does not inhibit polymerization for improving adhesibility to a medium to be recorded such as polyolefin or PET.

Specific examples of the tackifier may include high molecular weight tacky polymers described on pages 5 and 6 of JP-A No. 2001-49200 (e.g. a copolymer formed from an ester of (meth)acrylic acid and an alcohol having an alkyl group having 1 to 20 carbon atoms, an ester of (meth)acrylic acid and an alicyclic alcohol having 3 to 14 carbon atoms, or an ester of (meth)acrylic acid and an aromatic alcohol having 6 to 14 carbon atoms), and a low molecular weight tackifying resin having a polymerizable unsaturated bond.

[Preferable Physical Properties of Ink Composition]

When the ink composition of the invention is applied to inkjet recording, the viscosity is preferably 7 mPa·s to 30 mPa·s, more preferably 7 mPa·s to 20 mPa·s at the temperature for jetting (e.g., 40° C. to 80° C., preferably 25° C. to 30° C.) in view of jetting property. For example, the viscosity of the ink composition of the invention at room temperature (25° C. to 30° C.) is preferably 35 mPa·s to 500 mPa·s, more preferably 35 mPa·s to 200 mPa·s.

It is preferable to suitably adjust the composition ratio of the ink composition of the invention so that the viscosity falls within the above-mentioned range. By setting the viscosity at room temperature to be high, penetration of the ink into the medium to be recorded is avoided even when a porous medium to be recorded is used, uncured monomers may be decreased, and odor may be decreased. Furthermore, it is preferable since bleeding of the ink may be suppressed during landing of ink droplets, whereby image quality is improved.

The surface tension of the ink composition of the invention is preferably 20 mN/m to 30 mN/m, more preferably 23 mN/m to 28 mN/m. When recording is carried out on various types of medium to be recorded including polyolefin, PET, coated paper and uncoated paper, the surface tension is preferably at least 20 mN/m in view of bleeding and penetration, preferably not more than 30 mN/m in view of wettability.

The ink composition of the invention is preferably used for inkjet recording. When the ink composition of the invention is used for inkjet recording, the ink composition of the present invention is discharged onto a medium to be recorded using a inkjet recording apparatus and the ink composition so discharged is cured by irradiation with radioactive ray.

The printed product obtained by the ink composition has an image section having excellent intensity which has been cured by radioactive ray such as ultraviolet ray, and may be used for image forming by the ink composition, as well as for various applications, for example, formation of an ink receiving layer (image section) of a planographic printing plate.

<Inkjet Recording Method and Printed Product>

An inkjet recording method to which the ink composition of the invention is preferably applied (the inkjet recording method of the invention) is described below.

The inkjet recording method of the invention is characterized in that the method includes jetting the ink composition of the invention onto a medium to be recorded (supports, recording material or the like), and curing the ink composition by irradiating the jetted ink composition with radioactive ray. An image is formed on the medium to be recorded by the cured ink composition.

Recording media (substrates) which may be applied to the inkjet recording method of the invention are not particularly limited, and common papers such as non-coated and coated papers, various non-absorptive resin materials used in so-called soft packaging, and resin films formed from the non-absorptive resin materials into films may be used. Examples of the various plastic films include PET films, OPS films, OPP films, ONy films, PVC films, PE films and TAC films. Examples of the other plastics for use as the material of the medium to be recordeds include polycarbonate, acrylic resins, ABS, polyacetal, PVA and rubbers. In addition, metals and glasses may also be used as the medium to be recorded.

The recording media which may be applied to the inkjet recording method of the invention may also include supports for planographic printing plates.

Examples of the radioactive ray which is applied to the inkjet recording method of the invention may include α-ray, γ-ray, X-ray, ultraviolet ray, visible ray, infrared ray and electron beam. The peak wavelength of the radioactive ray is preferably 200 nm to 600 nm, more preferably 300 nm to 450 nm, and further preferably 350 nm to 420 nm. The output of the radioactive ray is preferably 2,000 mJ/cm$^2$ or less, more preferably 10 mJ/cm$^2$ to 2,000 mJ/cm$^2$, further preferably 20 mJ/cm$^2$ to 1,000 mJ/cm$^2$, and particularly preferably 50 mJ/cm$^2$ to 800 mJ/cm$^2$.

Specifically, in the inkjet recording method of the invention, it is preferable that the radioactive ray is irradiated from a light emitting diode which has an emission wavelength peak of 350 nm to 420 nm and generates ultraviolet ray which gives the maximum illuminance of 10 mW/cm$^2$ to 2,000 mW/cm$^2$ on the surface of the medium to be recorded. The ink composition of the invention cures with high sensitivity by light of low exposure amount such as light emitted from a light emitting diode.

Since the inkjet recording method of the invention uses the above-mentioned ink composition of the invention and cures the ink composition by irradiating radioactive ray, an image having excellent scratch resistance and suppressed surface tackiness may be formed. The radioactive ray may be irradiated by exposing at one time after jetting of all colors, but it is preferable to expose by every one color in view of acceleration of curing.

The printed product of the invention is obtained by forming an image using the ink composition of the invention by the above-mentioned inkjet recording method (the inkjet recording method of the invention).

Therefore, the printed product has an image having excellent scratch resistance and suppressed tackiness of the surface.

As mentioned above, the ink composition of the invention is preferably used for forming images for general printed products, and may also be preferably used in an exemplary embodiment in which an image is formed on a medium to be recorded such as a substrate and the medium to be recorded is then processed.

Nowadays, printed products including decorative sheets whose surface has been mold-processed are used in various applications. For example, in membrane switch surface sheets which are used for electrical appliances, an image is formed on a thin plastic sheet (PET, polycarbonate, polystyrene or the like having a film thickness of about 100 μm), and a switch part (click part) is then embossed for the purpose of imparting feeling of click. In many other examples, a printed product on which an image has been formed is embossed so that the printed product is matted or has appearance of solidity in view of designing.

Furthermore, automatic vending machines for beverage commercial products including drinking water, teas and juices have been widely used, and dummy displays for showing sold commercial products are displayed in these automatic vending machines. These dummy displays are prepared by first preparing a planar substrate in which a decorative printing has been formed (an image has been formed) on a transparent thermoplastic resin sheet, which is then subjected to deep drawing to have a half shape of a real shape of a beverage commercial product container to form a molded product having a high rearing (in some cases deep drawing of 25 mm or more), so that they may make strong appeal of brand images by irradiating light from their back surfaces.

As the processing method for preparing deep drawing molded products of the decorative thermoplastic resin sheet as mentioned above, vacuum molding, pressure molding or vacuum pressure molding is most preferable. The vacuum molding includes, in principle, pre-heating a planar substrate to a temperature at which the substrate may be deformed by heat, pressure-bonding the substrate to a mold while the substrate is aspirated and stretched toward the mold by reducing pressure, and cooling, whereas the pressure molding includes pressure-bonding to the mold by pressurizing from the opposite side of the mold, and cooling. In the vacuum pressure molding, the above-mentioned depressurization and pressurization are performed at the same time.

The required performance of the ink to be used for printed products which are processed by these methods is that an image (printed product) obtained is hard to cause cracking, peeling and the like, and that the impact resistance, flexibility and substrate adhesibility of a cured film are improved. In response to this requirement, the ink composition of the invention is strong against impact since it contains a specific compound, and thus the surface may be cured efficiently; and the ink composition of the invention maintains the curability of the surface (a film having high viscoelasticity and no tackiness) even when a bulk formed into a flexible film (a soft film having low viscoelasticity). Therefore, the ink composition of the invention may exhibit a specifically fine effect in applications in which the above-mentioned processing is performed after formation of an image.

Among the above-mentioned applications of the ink composition of the invention, vacuum-forming is particularly preferable.

The exemplary embodiments of the invention are listed below.

<1> An ink composition including a radical polymerizable compound, a photopolymerization initiator and a chain transfer agent, wherein the radical polymerizable compound contains a monofunctional monomer at a ratio of 85% by weight or more in the total weight of the radical polymerizable compound.

<2> The ink composition of <1>, wherein the chain transfer agent is a multifunctional thiol.

<3> The ink composition of <1> or <2>, wherein the molecular weight of the chain transfer agent is from 250 to 100,000.

<4> The ink composition of any of <1> to <3>, wherein an addition amount of the chain transfer agent in the ink composition is from 0.1% by weight to 15% by weight with respect to the total solid weight of the ink composition.

<5> The ink composition of any of <1> to <4>, wherein the monofunctional monomer contains one or more kinds selected from the group consisting of an amine group-containing monomer, N-vinylcaprolactam, tetrahydrofurfuryl acrylate, isobornyl acrylate and phenoxyethyl acrylate.

<6> The ink composition of any of <1> to <5>, wherein the photopolymerization initiator is selected from the group consisting of α-aminoketones and acylphosphine oxides.

<7> The ink composition of any of <1> to <6>, which contains a polymer having partial structures selected from the group consisting of a fluorine-substituted hydrocarbon group, a siloxane skeleton and a long chain alkyl group at a side chain.

<8> The ink composition of any of <1> to <7>, which is for inkjet recording.

<9> The ink composition of any of <1> to <7>, which is used for printing on vacuum-formed processed products.

Examples

Hereinafter the invention is further specifically described by the Examples, but the invention should not be limited to the following Examples unless it exceeds the gist thereof. Unless otherwise mentioned, the "part" is based on weight.

<Preparation of Pigment Dispersions>

Pigment dispersions of respective colors (Y1, M1, C1 and K1) were prepared by mixing the pigment, dispersing agent and solvent indicated below.

Yellow pigment dispersion 1 (Y1)

| | |
|---|---|
| Pigment: C.I. Pigment Yellow 12 | 10 parts |
| Dispersing agent: a polymer dispersing agent [trade name: SOLSPERSE 32000, manufactured by Zeneca Ltd.] | 5 parts |
| Solvent: phenoxyethyl acrylate | 85 parts |

Magenta Pigment Dispersion 1 (M1)

| | |
|---|---|
| Pigment: C.I. Pigment Red 57:1 | 15 parts |
| Dispersing agent: a polymer dispersing agent [trade name: SOLSPERSE 32000, manufactured by Zeneca Ltd.] | 5 parts |
| Solvent: phenoxyethyl acrylate | 80 parts |

Cyan Pigment Dispersion 1 (C1)

| | |
|---|---|
| Pigment: C.I. Pigment Blue 15:3 | 20 parts |
| Dispersing agent: a polymer dispersing agent [trade name: SOLSPERSE 32000, manufactured by Zeneca Ltd.] | 5 parts |
| Solvent: phenoxyethyl acrylate | 75 parts |

Black Pigment Dispersion 1 (K1)

| | |
|---|---|
| Pigment: C.I. Pigment Black 7 | 20 parts |
| Dispersing agent: a polymer dispersing agent [trade name: SOLSPERSE 32000, manufactured by Zeneca Ltd.] | 5 parts |
| Solvent: phenoxyethyl acrylate | 75 parts |

<Preparation of Ink Compositions>

The ink compositions as shown in Table 1 were prepared by mixing the following components.

The polymerizable compound shown in the column "polymerizable compound" in Table 1 by the amount shown in Table 1

Chain transfer agent (the chain transfer agent shown in Table 1) 2.0 parts

Pigment dispersion (the pigment dispersion shown in Table 1) 4.0 parts

Photopolymerization initiator [trade name: IRGACURE 819, manufactured by Ciba Specialty Chemicals K.K.] 8.0 parts Biphenylbenzoyl (photopolymerization initiator) 4.0 parts Photopolymerization initiator [trade name: IRGACURE 184, manufactured by Ciba Specialty Chemicals K.K.] 2.0 parts Stabilizer [trade name: GENORAD 16, manufactured by Rahn] 0.05 part Surface-segregating polymer [trade name: BYK-UV3500, manufactured by BYK Chemie] 0.5 part The specifics on the polymerizable compounds shown in the column "polymerizable compound" in Table 1 are as follows.

PEA; phenoxyethyl acrylate (monofunctional monomer)
NVC; N-vinylcaprolactam (monofunctional monomer)
THFA; tetrahydrofurfuryl acrylate (monofunctional monomer)
IBOA; isobornyl acrylate (monofunctional monomer)
Amino-containing; dimethylaminoethyl acrylate (monofunctional monomer)
Other monomer; benzyl acrylate (monofunctional monomer) dicyclopentanyl acrylate (monofunctional monomer)
3002A; epoxy ester 3002A (polymerizable compound) [PO-modified bisphenol A diglycidyl ether diacrylate, manufactured by Kyoeisha Chemical Co., Ltd.]

The "amino-containing" means "amino group-containing monomer". Furthermore, the amount ratio of the "other monomer" used in Example 19 is benzyl acrylate/dicyclopentanyl acrylate=36.0/40.5 based on weight.

In Table 1, the units in the numerical values for the "PEA", "NVC", "THFA", "IBOA", "amino-containing", "other monomer" and "3002A" in the column of the polymerizable compound are represented by parts by weight. The "ratio %" in the column of the polymerizable compound is a ratio (% by weight) of the monofunctional monomer in the total weight of the radical polymerizable compound.

In Table 1, the CTA-1 to CTA-8 shown in the column of the chain transfer agent are the CTA-1 to CTA-8 of the abovementioned exemplified compounds which are listed as more preferable compounds as a chain transfer agent.

[Evaluation]

<Inkjet Image Recording (Printing)>

First, the prepared ink composition was filtered using a filter having an absolute filtration accuracy of 2 μm.

Next, an image was recorded on a medium to be recorded by using a commercially available inkjet recording apparatus equipped with a piezoelectric inkjet nozzle. The ink-supplying system was composed of an ink stock tank, a supply pipe, an ink-supplying tank positioned immediately anterior to an inkjet head, a filter, and a piezoelectric inkjet head. The region ranging from the ink-supplying tank to the inkjet head was insulated and heated. The temperature sensors were placed close to the ink-supplying tank and inkjet head nozzle, and the nozzle part was controlled so that the temperature was constantly in the range of 70° C.±2° C. The piezoelectric inkjet head was driven to eject multi-sized dots of from 8 pl to 30 pl at a resolution of 720×720 dpi. The "dpi" used in the invention means a number of dots per 2.54 cm.

The ink composition after filtration was discharged using the above-mentioned inkjet recording apparatus at an environmental temperature of 25° C., and ultraviolet ray was irradiated using an UV-LED (trade name: NCCU033, manufactured by Nichia Corporation). The LED outputs ultraviolet ray at a wavelength of 365 nm from one chip, and light of about 100 mW is emitted from a chip by conducting an electric current of about 500 mA. When plural LEDs were arrayed at 7 mm intervals, a power of 0.3 W/cm$^2$ may be obtained on the surface of the medium to be recorded. The period from after dropping to exposing of the ink composition, and the exposure period may be varied by the carrying velocity of the medium to be recorded and the distance between the head and the LED in the direction of carrying. In this example, the ink was exposed after 0.2 seconds from landing.

The exposing energy on the medium to be recorded may be adjusted to be from 0.01 J/cm$^2$ to 15 J/cm$^2$ according to the settings of the distance between the UV-LED and the medium to be recorded, and the carrying velocity of the medium to be recorded. The irradiation period was a period until the time at which adhesive feeling was diminished on the image surface after irradiation of ultraviolet ray. As the medium to be recorded, a polycarbonate sheet was used.

Under these conditions, the storage stability and jetting stability of the ink composition, the blocking sensitivity of the image using the ink composition (cured film of the ink composition), presence or absence of volatile components, and presence or absence of odor were evaluated by the following method.

Furthermore, the degree of elongation, and the adhesibility to the medium to be recorded of the image formed using the ink composition (cured film of the ink composition) were evaluated under the conditions mentioned below.

(Evaluation of Storage Stability)

After the ink compositions prepared were stored at 75% RH and 60° C. for three days, the ink viscosity was determined at the jetting temperature, and increase in the ink viscosity was determined as viscosity ratio, i.e., viscosity after storage/viscosity before storage. The viscosity ratio being closer to 1.0 indicated no change in viscosity and better storage stability, which was evaluated as A, whereas nozzle clogging occurred at the time of jetting when an ink with the viscosity ratio exceeding 1.5 was used, which was evaluated as C.

(Evaluation of Jetting Stability)

The jetting stability of the ink composition (after filtration) obtained as described above at the head nozzle was evaluated as follows.

That is, the number of nozzle loss after continuous jetting using a commercially available inkjet recording apparatus with a piezoelectric inkjet nozzle for 60 minutes was measured under the following conditions.

—Conditions—

Number of channels: 318/head

Driving frequency: 4.8 kHz/dot

Ink droplets: 7 drops, 42 pl

Temperature: 45° C.

In the experiment, a method including jetting the ink composition on a PET substrate and exposing the substrate (exposure amount: 1,000 mW/cm$^2$) was used, and the number of nozzle loss (number of clogged nozzles) during the method was counted.

—Evaluation Criteria—

A: nozzle loss 0 or more and lower than 5

B: nozzle loss 5 or more and lower than 10

C: nozzle loss 10 or more (Evaluation of Blocking Sensitivity)

Five-hundred PET sheets (size: same size in both longitudinal and width directions as that of the polycarbonate sheet on which an image had been formed, weight: 2 g/sheet) were stacked on the image which had been irradiated with ultraviolet ray, which was obtained by applying the above-mentioned inkjet recording method, and left for a day, and transfer to the PET was evaluated by visual observation. The case where transfer was not observed was evaluated as A and the case where transfer was observed was evaluated as C, and the amount of exposure energy (mJ/cm$^2$) which was required until transfer was not observed was defined as blocking sensitivity.

The allowable range of blocking sensitivity is 12,000 mJ/cm$^2$ or less, more preferably 8,000 mJ/cm$^2$ or less.

(Evaluation of Volatile Components)

The image formed on the polycarbonate sheet using the ink composition (printed product) was cut into 5 cm×5 cm. This printed product of 5 cm square was stored in a sealed glass container at 120° C. for 1 week, and presence or absence of volatile components adhered to the glass container was visually observed.

—Evaluation Criteria—

A: adhered substance was not observed

C: adhered substance was observed (Evaluation of Odor)

The image formed on the polycarbonate sheet using the ink composition (printed product) was cut into 5 cm×5 cm. This printed product of 5 cm square was stored in a sealed glass container at 120° C. for 1 week, the glass container was opened, and odor of volatile components in the container was smelled.

—Evaluation Criteria—
A: no odor of volatile components
C: odor of volatile components (Evaluation of Degree of Elongation)

A cured film of the ink composition was prepared in a similar manner to the above-mentioned inkjet image recording except that the accumulated exposure amount was adjusted to 12,000 mJ/cm$^2$ and the illuminance was adjusted to 2140 mW/cm$^2$. The cured film obtained was cut into 5 cm axis length×2.5 cm width, and elongated using a tensile tester (trade name: AUTOGRAPH AGS-J, manufactured by Shimadzu Corporation) at room temperature (20° C.) at a velocity of 30 cm/min to measure the degree of elongation at which the cured film was broken. The state in which the cured film was elongated from the original length to double length was defined as 100% degree of elongation.

The allowable range of degree of elongation may be 100% or more in order to correspond to a roll substrate, or 200% or more, and more preferably 300% or more in the case of use in applications for forming process.

(Evaluation of Adhesibility)

A cured film of the ink composition was prepared in a similar manner to the above-mentioned inkjet image recording except that a solid image was printed on a polycarbonate sheet using the ink composition. The sample obtained was evaluated by a cross-hatch test. In this test, evaluation was made based on JISK5600 using a six point scale of 0 to 5, in which 0 was evaluated as the best and 1 was evaluated as a practically acceptable level.

—Evaluation Criteria—
A: 0
B: 1
C: within the range of 2 to 5

TABLE 1

| | | Pigment dispersion | Polymerizable compounds | | | | | | 3002 A | ratio % | Chain transfer agent |
| | | | PEA | NVC | THFA | IBOA | Amino-containing | Other monomer | | | |
|---|---|---|---|---|---|---|---|---|---|---|---|
| Examples | 1 | K1 | 36.0 | 40.5 | — | — | — | — | 3.0 | 96.2 | KARENZ MTPE1 |
| | 2 | M1 | 36.0 | 40.5 | — | — | — | — | 3.0 | 96.2 | KARENZ MTBD1 |
| | 3 | C1 | 36.0 | 40.5 | — | — | — | — | 3.0 | 96.2 | KARENZ MTNR1 |
| | 4 | Y1 | 36.0 | 40.5 | — | — | — | — | 3.0 | 96.2 | CTA-1 |
| | 5 | K1 | 36.0 | 40.5 | — | — | — | — | 3.0 | 96.2 | CTA-2 |
| | 6 | K1 | 36.0 | 40.5 | — | — | — | — | 3.0 | 96.2 | CTA-3 |
| | 7 | K1 | 36.0 | 40.5 | — | — | — | — | 3.0 | 96.2 | CTA-4 |
| | 8 | K1 | 36.0 | 40.5 | — | — | — | — | 3.0 | 96.2 | CTA-5 |
| | 9 | K1 | 36.0 | 40.5 | — | — | — | — | 3.0 | 96.2 | CTA-6 |
| | 10 | K1 | 36.0 | 40.5 | — | — | — | — | 3.0 | 96.2 | CTA-7 |
| | 11 | K1 | 36.0 | 40.5 | — | — | — | — | 3.0 | 96.2 | CTA-8 |
| | 12 | K1 | 36.0 | 40.5 | — | — | — | — | 3.0 | 96.2 | Dodecylthiol |
| | 13 | K1 | 36.0 | 40.5 | — | — | — | — | 3.0 | 96.2 | Didodecyl disulfide |
| | 14 | K1 | 36.0 | 40.5 | — | — | — | — | 3.0 | 96.2 | Benzyl dithiobenzoate |
| | 15 | K1 | 36.3 | 40.8 | — | — | — | — | 12.4 | 86.2 | KARENZ MTPE1 |
| | 16 | K1 | 41.0 | 46.1 | — | — | — | — | 2.4 | 97.3 | KARENZ MTPE1 |
| | 17 | K1 | 36.0 | 40.5 | — | — | — | — | 3.0 | 85.5 | Dodecylsulfide |
| | 18 | K1 | 36.0 | 40.5 | — | — | — | — | 36.0 | 85.5 | KARENZ MTPE1 |
| | 19 | K1 | — | — | — | — | — | 36.0/40.5 | 3.0 | 85.5 | KARENZ MTPE1 |
| | 20 | K1 | — | — | 40.5 | 36.0 | — | — | 3.0 | 96.2 | KARENZ MTBD1 |
| | 21 | K1 | 36.0 | — | | 40.5 | — | — | 3.0 | 96.2 | KARENZ MTBD1 |
| | 22 | K1 | 31.0 | 40.5 | — | — | 5.0 | — | 3.0 | 96.2 | KARENZ MTBD1 |
| Comparative Examples | 1 | K1 | 36.0 | 40.5 | — | — | — | — | 3.0 | 96.2 | None |
| | 2 | K1 | 35.0 | 39.4 | — | — | — | — | 15.1 | 83.1 | KARENZ MTPE1 |

| | | Storage stability | Jetting stability | Blocking sensitivity | Volatile components | Odor | Degree of elongation (%) | Adhesion |
|---|---|---|---|---|---|---|---|---|
| Examples | 1 | A | A | 8,000 | A | A | 320 | A |
| | 2 | A | A | 8,000 | A | A | 320 | A |
| | 3 | A | A | 8,000 | A | A | 320 | A |
| | 4 | A | A | 7,000 | A | A | 320 | A |
| | 5 | A | A | 7,000 | A | A | 320 | A |
| | 6 | A | A | 6,500 | A | A | 320 | A |
| | 7 | A | A | 7,000 | A | A | 320 | A |
| | 8 | A | A | 7,000 | A | A | 320 | A |
| | 9 | A | A | 7,000 | A | A | 320 | A |
| | 10 | A | A | 8,000 | A | A | 320 | A |
| | 11 | C | A | 8,000 | A | A | 320 | A |

TABLE 1-continued

|  |  |  |  |  |  |  |  |  |
|---|---|---|---|---|---|---|---|---|
|  | 12 | C | A | 12,000 | A | A | 280 | A |
|  | 13 | C | A | 12,000 | A | C | 280 | A |
|  | 14 | C | A | 12,000 | A | C | 290 | A |
|  | 15 | A | A | 8,000 | A | A | 100 | B |
|  | 16 | A | A | 8,000 | A | A | 340 | A |
|  | 17 | A | A | 12,000 | A | A | 300 | A |
|  | 18 | A | A | 5,000 | A | A | 290 | A |
|  | 19 | A | A | 10,000 | A | A | 280 | C |
|  | 20 | A | A | 12,000 | A | A | 320 | A |
|  | 21 | A | A | 9,000 | A | A | 300 | B |
|  | 22 | A | A | 7,000 | A | A | 320 | A |
| Comparative | 1 | A | A | 18,000 | C | A | 270 | A |
| Examples | 2 | A | A | 7,000 | A | A | 60 | B |

As can be seen from Table 1, by using the ink composition of the Examples, an ink cured film which contains smaller residual volatile components after curing of the ink composition and has higher degree of elongation and higher flexibility as compared to the ink compositions of the Comparative Examples may be obtained.

According to the invention, an ink composition which is excellent in flexibility and may decrease residual volatile components, which is preferable for inkjet recording, may be provided.

What is claimed is:

1. An ink composition comprising: a radical polymerizable compound; a photopolymerization initiator; and a chain transfer agent, wherein the radical polymerizable compound comprises a monofunctional monomer having one radical polymerizable ethylenic unsaturated bond in a molecule, at a ratio of 85% by weight or more in the total weight of the radical polymerizable compound, wherein the monofunctional monomer comprises at least one selected from the group consisting of N-vinyl caprolactam, tetrahydrofurfuryl acrylate, isobornyl acrylate and phenoxyethyl acrylate, and wherein the chain transfer agent is a secondary or tertiary multifunctional thiol compound having a molecular weight of from 3,000 to 80,000, the chain transfer agent is selected from the group consisting of the following compounds:

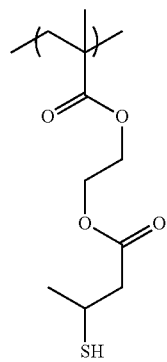
CTA-1

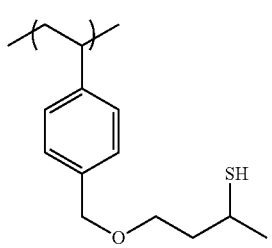
CTA-3

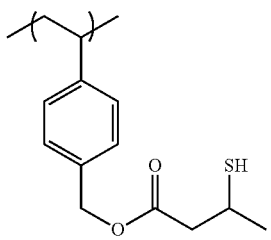
CTA-4

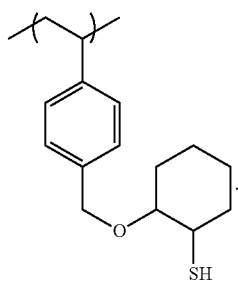
CTA-5

2. The ink composition of claim 1, wherein an addition amount of the chain transfer agent in the ink composition is from 0.1% by weight to 15% by weight with respect to the total solid weight of the ink composition.

3. The ink composition of claim 1, wherein the photopolymerization initiator is selected from the group consisting of α-aminoketones and acylphosphine oxides.

4. The ink composition of claim 1, further comprising a polymer having a partial structure selected from the group consisting of a fluorine-substituted hydrocarbon group, a siloxane skeleton and a long chain alkyl group at a side chain.

5. The ink composition of claim 1, which is for inkjet recording.

6. The ink composition of claim 1, which is used for printing on vacuum-formed processed products.

7. The ink composition of claim 1, wherein the radical polymerizable compound comprises the monofunctional monomer at a ratio of from 90% by weight to 100% by weight in the total weight of the radical polymerizable compound.

8. The ink composition of claim 1, wherein the monofunctional monomer comprises N-vinylcaprolactam and phenoxyethyl acrylate.

* * * * *